US012691963B2

(12) United States Patent
Yamamoto et al.

(10) Patent No.: US 12,691,963 B2
(45) Date of Patent: Jul. 28, 2026

(54) OPERATION PEDAL SYSTEM

(71) Applicant: SUZUKI MOTOR CORPORATION, Hamamatsu (JP)

(72) Inventors: Takayo Yamamoto, Hamamatsu (JP); Koji Kobayashi, Hamamatsu (JP); Hideaki Fukushima, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 390 days.

(21) Appl. No.: 18/480,892

(22) Filed: Oct. 4, 2023

(65) Prior Publication Data

US 2024/0116589 A1 Apr. 11, 2024

(30) Foreign Application Priority Data

Oct. 7, 2022 (JP) ................................. 2022-162465

(51) Int. Cl.
*B62J 25/06* (2020.01)
*B62K 23/08* (2006.01)

(52) U.S. Cl.
CPC .............. *B62J 25/06* (2020.02); *B62K 23/08* (2013.01)

(58) Field of Classification Search
CPC ... B62L 3/04; B62K 23/08; B62J 25/04; B62J 25/06
USPC ............................ 74/563, 564; 280/291, 169
See application file for complete search history.

(56) References Cited

U.S. PATENT DOCUMENTS

| | | | | |
|---|---|---|---|---|
| 1,918,919 | A | * | 7/1933 | Lambert ................ G05G 1/487 |
| | | | | 74/563 |
| 1,977,415 | A | * | 10/1934 | Thorp .................... G05G 1/483 |
| | | | | 482/79 |
| 2,084,018 | A | * | 6/1937 | Edwards ................. B60R 3/002 |
| | | | | 280/169 |
| 4,345,487 | A | * | 8/1982 | Straker ................... B62M 3/08 |
| | | | | 74/594.4 |

(Continued)

FOREIGN PATENT DOCUMENTS

| | | | |
|---|---|---|---|
| DE | 202014002485 | U1 | 6/2014 |
| JP | S 50-134855 | U | 4/1974 |

(Continued)

OTHER PUBLICATIONS

Office Action dated Oct. 6, 2025, issued to European Application No. 23201816.8.
(Continued)

*Primary Examiner* — Anne Marie M Boehler
(74) *Attorney, Agent, or Firm* — Stein IP LLC

(57) ABSTRACT

An operation pedal system that is installed in a straddle-type vehicle includes an operation pedal having an arm portion and a pedal portion, and a tread surface forming member that is attached to the pedal portion to form a first tread surface above the pedal portion that receives a stepping force when a stepping operation is performed on the operation pedal. In the operation pedal system, the tread surface forming member is separate from the operation pedal, and the tread surface forming member has a body portion having a tread surface forming surface forming the first tread surface on an upper surface, and an attachment mechanism provided on the body portion for detachably attaching the tread surface forming member to the pedal portion.

7 Claims, 11 Drawing Sheets

(56)     References Cited

U.S. PATENT DOCUMENTS

| | | | | |
|---|---|---|---|---|
| 4,591,179 | A * | 5/1986 | Nakamura ............... | B62J 25/06 |
| | | | | 74/564 |
| 5,673,597 | A * | 10/1997 | Lin ........................... | B62L 3/04 |
| | | | | 74/594.4 |
| 5,738,180 | A * | 4/1998 | Hofmann ................. | B62J 25/04 |
| | | | | 74/564 |
| 5,913,948 | A * | 6/1999 | Lien ........................ | G05G 1/483 |
| | | | | 74/563 |
| 6,439,754 | B1 * | 8/2002 | Lin ......................... | B60K 26/02 |
| | | | | 362/396 |
| 6,622,592 | B2 * | 9/2003 | Lee ........................ | G05G 1/483 |
| | | | | 74/561 |
| 7,621,550 | B1 * | 11/2009 | Boruff ...................... | B62H 1/02 |
| | | | | 280/293 |
| 7,793,961 | B2 * | 9/2010 | Day ......................... | B62J 25/04 |
| | | | | 74/564 |
| 2010/0175942 | A1 * | 7/2010 | Griep ...................... | B62J 25/04 |
| | | | | 280/291 |
| 2019/0202524 | A1 * | 7/2019 | Tada ......................... | B62L 3/04 |
| 2019/0367130 | A1 * | 12/2019 | Yaffe ..................... | B62M 25/06 |

FOREIGN PATENT DOCUMENTS

| | | | |
|---|---|---|---|
| JP | H 06-191462 | A | 7/1994 |
| KR | 89-0008794 | U | 5/1989 |

OTHER PUBLICATIONS

Extended European Search Report dated Mar. 1, 2024, issued by the European Patent Office in corresponding application EP 23201816. 8.

* cited by examiner

*FIG.8A*          *FIG.8B*
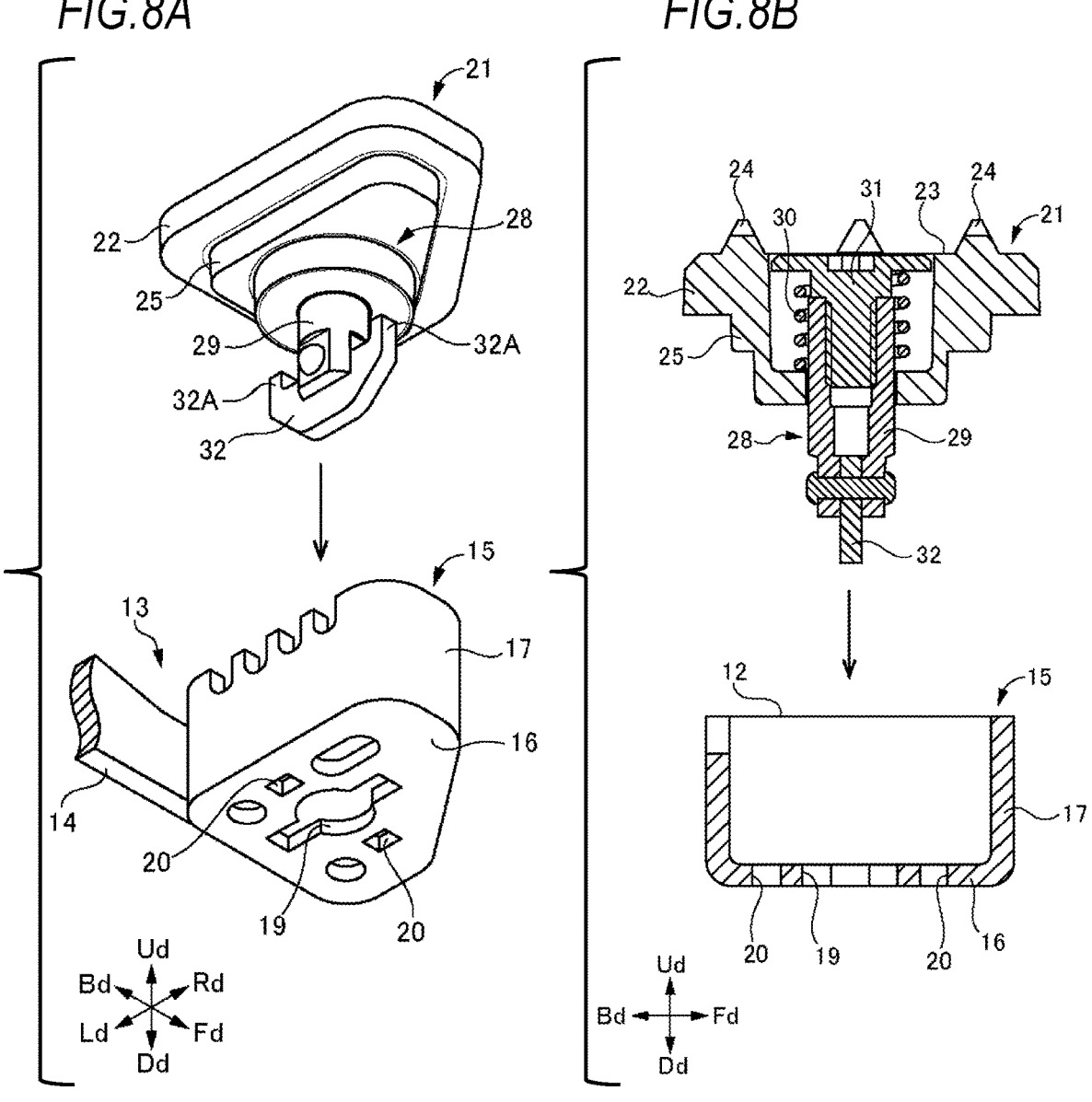

OPERATION PEDAL SYSTEM

CROSS-REFERENCE TO RELATED APPLICATIONS

The disclosure of Japanese Patent Application No. 2022-162465 filed on Oct. 7, 2022, including specification, drawings and claims is incorporated herein by reference in its entirety.

TECHNICAL FIELD

The present invention relates to an operation pedal system provided in a straddle-type vehicle.

BACKGROUND ART

Generally, in a straddle-type vehicle, footrests are respectively provided at lower right and lower left of a seat on which a driver of the straddle-type vehicle sits. In addition, a brake pedal, which is a type of an operation pedal, is provided on the lower right of the seat.

In addition, a riding posture of a driver of a straddle-type vehicle includes a sitting posture and a standing posture. When driving a straddle-type vehicle on a flat surface such as a paved road, normally, a driver sits on a seat, bends both knees, and places respective arches of left and right feet on footrests to steer the straddle-type vehicle. This posture is the sitting posture. On the other hand, when driving the straddle-type vehicle on uneven surfaces such as unpaved roads, the driver, with the arches of his or her left and right feet placed on the footrests, may slightly straightens both knees and steer the straddle-type vehicle with his or her buttocks off the seat. This posture is the standing posture.

Also, the driver brakes a rear wheel of the straddle-type vehicle by stepping on the brake pedal. Specifically, the driver puts a bottom (specifically, around a bulb of a big toe of the right foot) of a toe side of the right foot on the brake pedal, lowers the toe side of the right foot using the right footrest as a fulcrum, and pushes the brake pedal downward to brake a rear wheel.

In a case of the standing posture, positions of the toes of each leg are higher than in a case of the sitting posture because both knees tend to stretch. In addition, in the case of the standing posture, a range in which the toe side of each foot can be lowered becomes smaller due to the fact that a weight is applied to both feet. Additionally, when the driver is wearing sturdy, stiff shoes such as off-road boots, the range in which the toe side of each foot can be lowered is further reduced. For this reason, it is desirable to set a tread surface of the brake pedal higher in the standing posture than in the sitting posture in order to ensure good operability of a stepping operation on the brake pedal.

In the related art, a height position of a tread surface of a brake pedal is adjusted by changing a position of a yoke attached to a push rod of a rear brake master cylinder. That is, as illustrated in FIG. 5 of JP 1994-191462A (Patent Literature 1), a lower end portion of the push rod of the rear brake master cylinder is connected to a rear end portion of a brake pedal via the yoke. When raising a tread surface of the brake pedal, a position of the yoke is lowered so as to separate the yoke from the rear brake master cylinder. Adjusting the yoke position like this is performed by, first, loosening a yoke fixing nut provided on the push rod using a tool such as a spanner, then changing the position of the yoke, and then tightening the nut using the tool such as a spanner.

SUMMARY OF INVENTION

In the brake pedal of the related art, in order to adjust the height position of the tread surface, it is necessary to loosen or tighten the nut provided on the push rod using a tool such as a spanner, as described above. Therefore, there is a problem that the adjustment of the height position of the tread surface is complicated and the adjustment work takes time.

Also, a user of a straddle-type vehicle may drive a straddle-type vehicle on both a flat place and an uneven or undulating place, such as a paved road in town, a highway, an unpaved forest road, an off-road race course, and the like. In such a case, a brake pedal of the related art may cause inconvenience to the user. Specifically, since a tool such as a spanner is required to adjust a height position of a tread surface of the brake pedal, the user must carry a tool such as a spanner to adjust the height position of the tread surface of the brake pedal while traveling. Also, since it is complicated to adjust the height position of the tread surface of the brake pedal, while traveling, the user needs to secure a flat work space where the straddle-type vehicle can be stopped in a stable state in order to safely adjust the height position of the tread surface of the brake pedal. However, finding such a work space while traveling can be difficult.

Also, when the user of the straddle-type vehicle travels on both a flat place and an uneven or undulating place with the straddle-type vehicle, it would be convenient when a form of the tread surface of the brake pedal, such as an area of the tread surface of the brake pedal or a shape of an anti-slip formed on the tread surface of the brake pedal, could be easily changed according to conditions of a destination driving place. However, in the brake pedal of the related art, in order to change the form of the tread surface, it is necessary to replace the entire brake pedal. Replacing the entire brake pedal requires complicated work. It is difficult to perform this work while traveling.

The above-described problem that adjustment of the height position of the tread surface is complicated and the adjustment work takes time, the above-described problem that there is a possibility of forcing inconvenience to the user who drives the straddle-type vehicle on both a flat place and an uneven or undulating place, and the above-described problem of requiring complicated work such as replacing the entire operation pedal in order to change the form of the tread surface are not limited to the brake pedal, but may also occur to other operation pedals (for example, rotary shift pedals, or the like) of the related arts that are provided in straddle-type vehicles.

A first object of the present disclosure is to provide a highly convenient operation pedal system that can easily adjust a height position of a tread surface of an operation pedal provided on a straddle-type vehicle. A second object of the present disclosure is to provide a highly convenient operation pedal system that can easily change a shape of a tread surface of an operation pedal provided on a straddle-type vehicle.

An aspect of a present embodiment which can solve the above technical problem is an operation pedal system that is installed in a straddle-type vehicle, the operation pedal system including an operation pedal having an arm portion extending generally in a front-back direction of the straddle-type vehicle, and a pedal portion protruding outward in a left-right direction in the straddle-type vehicle from a front end portion of the arm portion, and a tread surface forming member that is attached to the pedal portion to form a first tread surface above the pedal portion that receives a stepping force when a stepping operation is performed on the operation pedal. In the operation pedal system, the tread surface forming member is separate from the operation pedal, and the tread surface forming member has, a body portion having a tread surface forming surface forming the first tread surface on an upper surface, and an attachment mechanism provided on the body portion for detachably attaching the tread surface forming member to the pedal portion.

According to the present embodiment, the height position of the tread surface of the operation pedal provided in the straddle-type vehicle can be easily adjusted, and thus the convenience of adjusting the height position of the tread surface of the operation pedal can be enhanced. Further, according to the present embodiment, the shape of the tread surface of the operation pedal provided on the straddle-type vehicle can be easily changed, and thus the convenience of changing the shape of the tread surface of the operation pedal can be enhanced.

BRIEF DESCRIPTION OF DRAWINGS

FIG. 2A illustrates a state where a tread surface forming member is attached to a pedal portion of a brake pedal, and FIG. 2B illustrates a state where the tread surface forming member is not attached to the pedal portion of the brake pedal.

FIG. 3A illustrates a state where the tread surface forming member is attached to the pedal portion of the brake pedal, and FIG. 3B illustrates a state where the tread surface forming member is not attached to the pedal portion of the brake pedal.

FIG. 4A illustrates a state where the tread surface forming member is not attached to a holder, and FIG. 4B illustrates a state where the tread surface forming member is attached to the holder.

FIG. 5A illustrates a state where the tread surface forming member is not attached to the holder, and FIG. 5B illustrates a state where the tread surface forming member is attached to the holder.

FIG. 6A illustrates a state where the tread surface forming member is not attached to the holder, and FIG. 6B illustrates a state where the tread surface forming member is attached to the holder.

FIG. 7A illustrates the tread surface forming member viewed from above, FIG. 7B illustrates the tread surface forming member viewed from below, FIG. 7C illustrates the tread surface forming member viewed from right, and FIG. 7D illustrates a cross section of the tread surface forming member taken along the cutting line VII-VII in FIG. 7A and viewed from right.

FIGS. 8A and 8B are explanatory views illustrating a method of attaching the tread surface forming member to a pedal portion in the example of the present embodiment.

DESCRIPTION OF EMBODIMENTS

Figure 1:
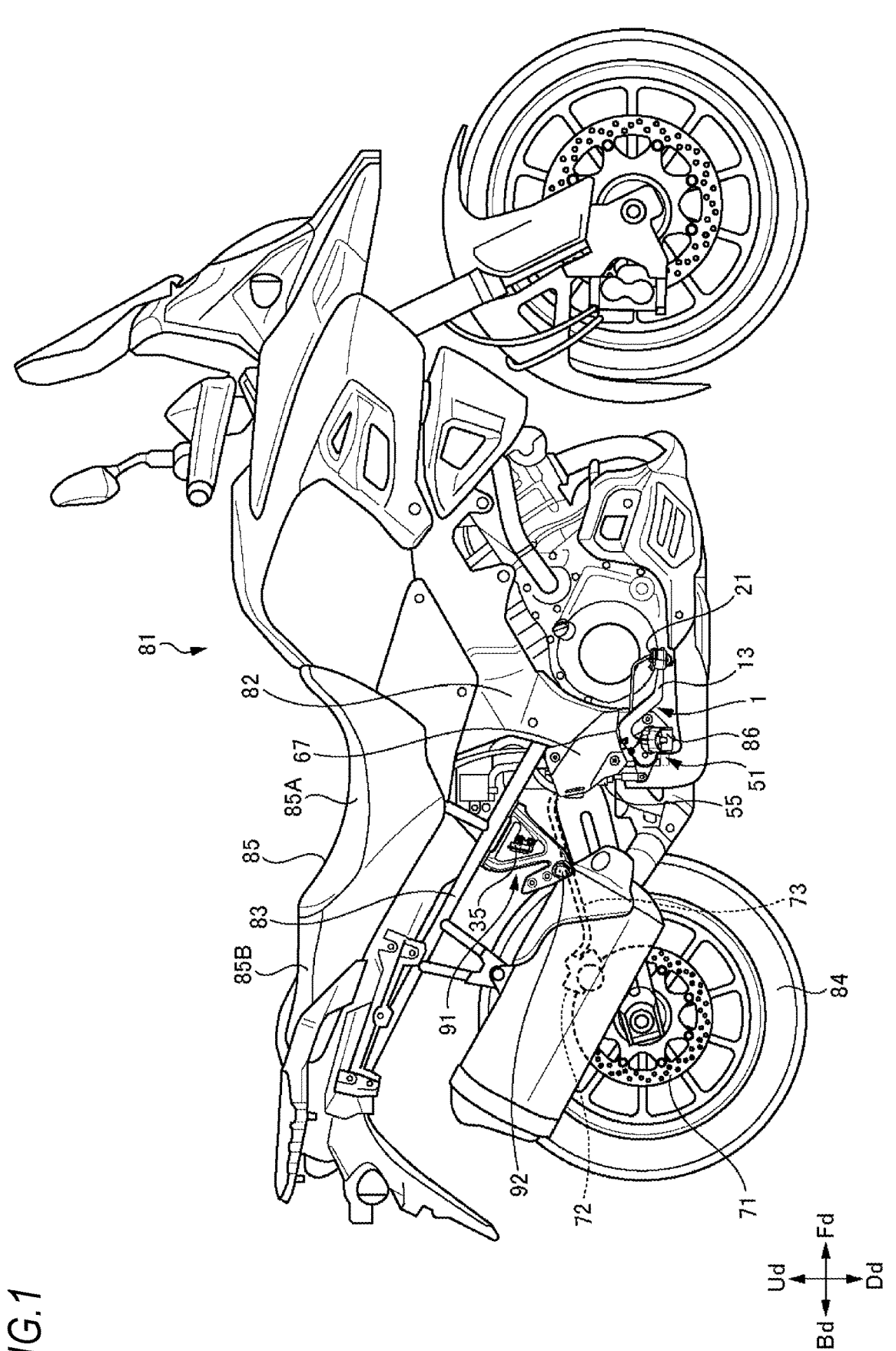
FIG. 1 is an explanatory view illustrating a straddle-type vehicle provided with a brake pedal system that is an example of an operation pedal system of the present embodiment.

An operation pedal system according to an embodiment of the present invention is an operation pedal system provided in a straddle-type vehicle and includes an operation pedal and a tread surface forming member. The operation pedal has an arm portion that extends generally in a front-back direction of the straddle-type vehicle, and a pedal portion that protrudes outward in a left-right direction in the straddle-type vehicle from a front end portion of the arm portion. Also, the tread surface forming member is a member that forms a first tread surface above the pedal portion that receives, by being attached to the pedal portion, a stepping force when a stepping operation on the operation pedal is performed, that is, a stepping force from occupant's foot when an occupant of the straddle-type vehicle steps on the operation pedal.

Also, the tread surface forming member is separate from the operation pedal. Further, the tread surface forming member has a body having a tread surface forming surface forming the first tread surface on an upper surface, and an attachment mechanism provided on the body portion for detachably attaching the tread surface forming member to the pedal portion.

According to the operation pedal system of this embodiment, a height position of the tread surface of the operation pedal can be adjusted by attaching or detaching the tread surface forming member to or from the pedal portion. For example, when a second tread surface is formed on the upper surface of the pedal portion, the tread surface of the operation pedal is the second tread surface when the tread surface forming member is not attached to the pedal portion. On the other hand, when the tread surface forming member is attached to the pedal portion, the tread surface forming surface of the body portion of the tread surface forming member is placed over the second tread surface of the operation pedal. Thereby, the first tread surface is formed above the second tread surface of the pedal portion by the tread surface forming surface of the body portion of the tread surface forming member. As a result, the tread surface of the operation pedal is the first tread surface. In this way, by attaching or detaching the tread surface forming member to or from the pedal portion, either the first tread surface or the second tread surface can be set as the tread surface of the operation pedal, and thus the height position of the tread surface of the operation pedal can be changed.

Further, according to the operation pedal system of this embodiment, by making the attachment mechanism of the tread surface forming member, for example, a latch type, a lock type, or a magnet type, and enabling a user of the straddle-type vehicle to easily attach the tread surface forming member to the pedal portion by hand without use of tools, a height position of the tread surface of the operation pedal can be easily adjusted, and thus the time required for adjustment work can be shortened. In addition, it is possible to eliminate the need to carry a tool such as a spanner, and thus it is possible to improve convenience of adjusting the height position of the tread surface of the operation pedal while traveling. Further, according to the operation pedal system of this embodiment, since the height position of the tread surface of the operation pedal can be easily adjusted, for example, the user can safely perform adjustment work even in slightly unstable places, such as a shoulder of an unpaved forest road while traveling, and thus it is possible to increase the convenience of adjusting the height position of tread surface of the operation pedal.

Further, in the operation pedal system of this embodiment, the tread surface forming member is a separate body from the operation pedal, and can be completely separated from the operation pedal. Therefore, when the tread surface forming member is not attached to the pedal portion, it is possible to prevent the tread surface forming member from interfering with a driver's stepping operation on the operation pedal.

As described above, as the embodiment of the present invention, a form where, by forming the second tread surface on the upper surface of the pedal portion and attaching or detaching the tread surface forming member to or from the pedal portion, the height position of the tread surface of the operation pedal can be set to either the first tread surface or the second tread surface is given as an example. However, the following other forms are also conceivable as embodiments of the present invention. For example, the configuration of the operation pedal system of the embodiment of the present invention is configured to include the operation pedal and two tread surface forming members having different thicknesses in the up-down direction of a body portion. As a result, by attaching the tread surface forming member with a thin body portion to the pedal portion, the height position of the tread surface of the operation pedal is lowered, whereas by attaching the tread surface forming member having a thick body portion to the pedal portion, the height position of the tread surface of the operation pedal can be raised. Further, when the configuration of the operation pedal system of the embodiment of the present invention is configured to include the operation pedal and three or more tread surface forming members each having a different thickness in the up-down direction of a body portion, by selecting the tread surface forming member attached to the pedal portion from among these three or more tread surface forming members, the height position of the tread surface of the operation pedal can be changed in multiple steps.

As described above, as the embodiment of the present invention, a form where by attaching or detaching the tread surface forming member to or from the pedal portion, or selecting the tread surface forming member attached to the pedal portion from among a plurality of tread surface forming members, the height position of the tread surface of the operation pedal is adjusted is given as an example. However, as still another embodiment of the present invention, it is also conceivable to change a form (for example, an area of the tread surface, a shape of an anti-slip formed on the tread surface, or the like) of the tread surface of the operation pedal by attaching or detaching the tread surface forming member to or from the pedal portion, or selecting the tread surface forming member attached to the pedal portion from among a plurality of tread surface forming members. In this case, for example, a form of a second tread surface formed on an upper surface of the pedal portion and a form of a tread surface forming surface of the body portion of the tread surface forming member are made different from each other. Alternatively, forms of tread surface forming surfaces of body portions of the plurality of tread surface forming members are made different from each other. According to this embodiment, the form of the tread surface of the operation pedal can be easily changed, and thus convenience of changing the form of the tread surface of the operation pedal can be enhanced.

EXAMPLE

An example of an operation pedal system of the present embodiment will be described with reference to the drawings. In addition, in the example, when describing directions of up (Ud), down (Dd), front (Fd), back (Bd), left (Ld), and right (Rd), follow the arrows drawn at the bottom left of each figure.

(Straddle-Type Vehicle)

FIG. 1 illustrates a straddle-type vehicle 81 provided with a brake pedal system 1 that is an example of the operation pedal system of the present embodiment. As illustrated in FIG. 1, a seat 85 is provided in an upper portion of the straddle-type vehicle 81 from a front-back direction intermediate portion to a rear portion. A driver seat portion 85A is formed in a front portion of the seat 85 on which a driver who is an occupant of the straddle-type vehicle 81 and operates the straddle-type vehicle 81 sits. A pillion seat portion 85B is formed in a rear portion of the seat 85 so that a fellow passenger who is another occupant of the straddle-type vehicle 81 sits thereon.

Further, in the straddle-type vehicle 81, driver footrests 86 are respectively provided at the lower left and lower right of the driver seat portion 85A of the seat 85. When the straddle-type vehicle 81 is steered, the driver puts the left and right feet on the driver footrests 86, respectively. Further, in the saddle-type vehicle 81, pillion footrest units 91 are respectively provided at a left front lower portion and a right front lower portion of the pillion seat portion 85B of the seat 85. The fellow passenger puts the left and right feet on pillion footrests 92 of the pillion footrest units 91, respectively.

A rear brake system 51 for braking a rear wheel 84 is provided in a lower portion of the straddle-type vehicle 81 from the front-back direction intermediate portion to the rear portion. The rear brake system 51 has a brake pedal 13, a tread surface forming member 21, a rear brake master cylinder 55, a rear brake disc 71, a rear brake caliper 72, a rear brake hose 73, and the like.

(Rear Brake System)

Figure 2A:
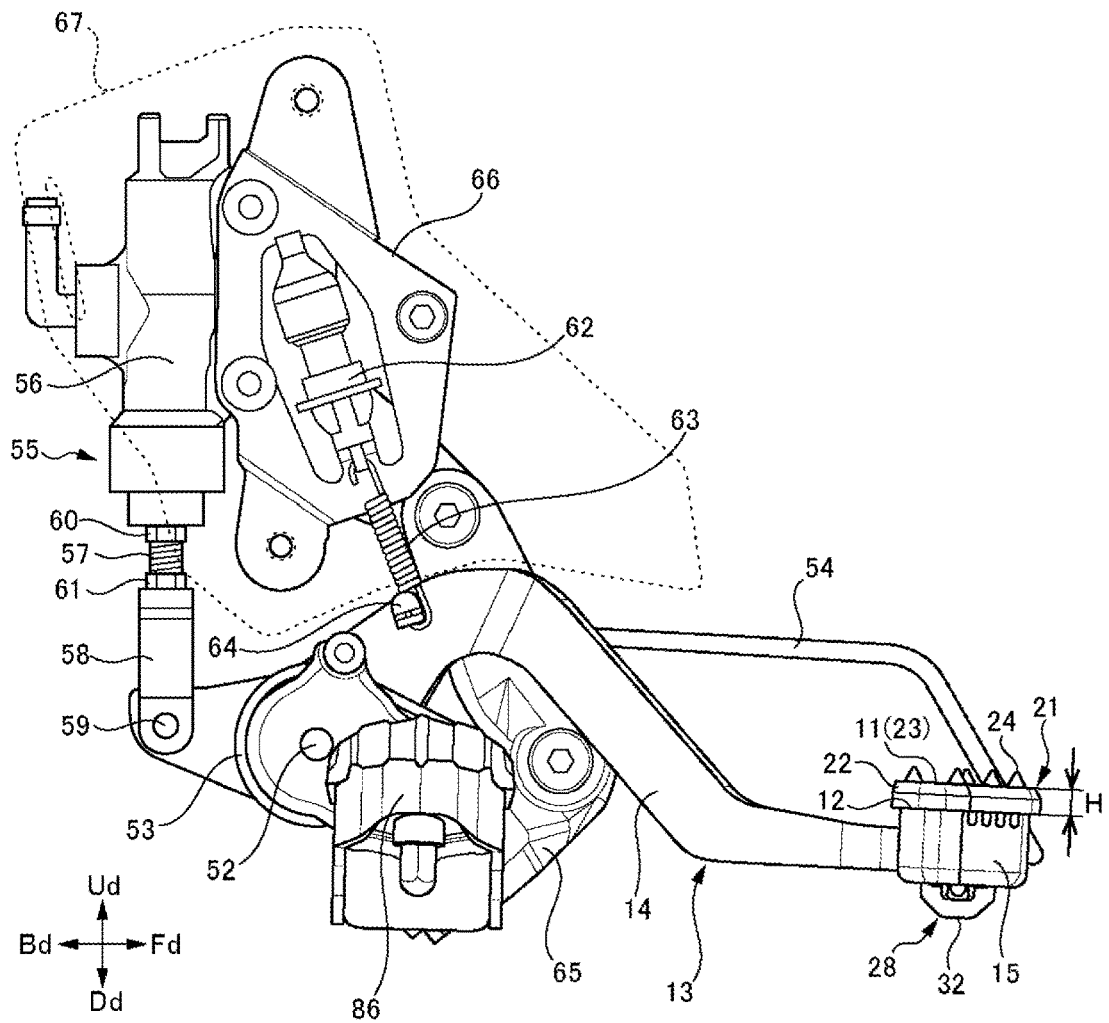
FIGS. 2A and 2B are explanatory views illustrating part of the rear brake system in the example of the present embodiment viewed from right, where
Figure 3A:
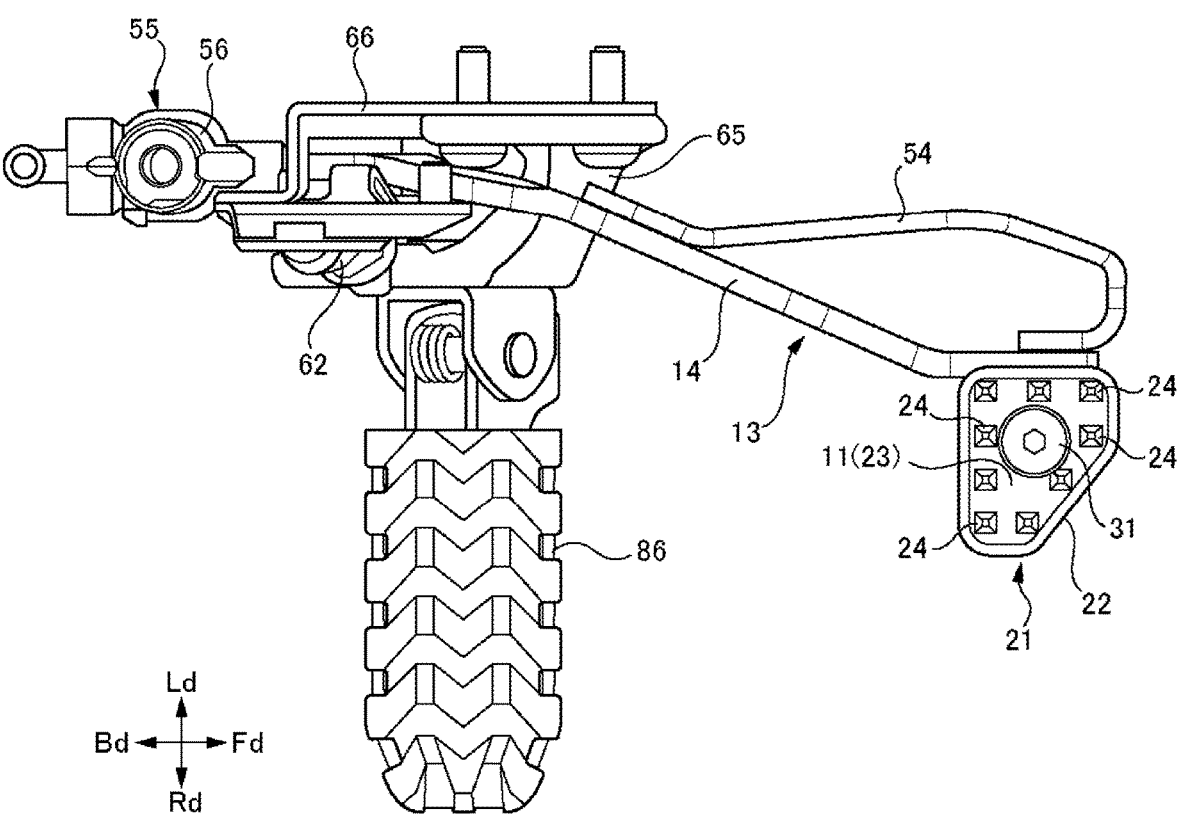
FIGS. 3A and 3B are explanatory views illustrating part of the rear brake system in the example of the present embodiment viewed from above, where

FIG. 2A illustrates, of components of the rear brake system 51, components arranged on a lower right side of the driver seat portion 85A of the seat 85 as viewed from the right. FIG. 3A illustrates a top view of the components of the rear brake system 51 in FIG. 2A.

Of the rear brake system 51, the brake pedal 13, the tread surface forming member 21, the rear brake master cylinder 55, and the like are arranged in the straddle-type vehicle 81 on the lower right side of the driver seat portion 85A of the seat 85.

The brake pedal 13 is supported by a lower bracket 65 fixed to a main frame 82 (see FIG. 1) of the straddle-type vehicle 81 via a pedal shaft 52 so as to be vertically swingable. A pedal spring 53 is provided on an outer peripheral side of the pedal shaft 52. A front portion of the brake pedal 13 is moved downward by a driver's stepping operation, and then when the stepping operation is released, the front portion of the brake pedal 13 is moved upward by a biasing force of the pedal spring 53 and returns to an initial position. Further, a pedal reinforcing member 54 for reinforcing the brake pedal 13 is provided in the front portion of the brake pedal 13 as illustrated in FIG. 3A. The tread surface forming member 21 is attached to a front end portion of the brake pedal 13. The brake pedal 13 and the tread surface forming member 21 will be described in detail below.

The rear brake master cylinder 55 is supported by the main frame 82 of the straddle-type vehicle 81 via an upper bracket 66 connected to the lower bracket 65. The rear brake master cylinder 55 has a cylinder body 56, a push rod 57, and a yoke 58, as illustrated in FIG. 2A. The push rod 57 protrudes downward from the cylinder body 56. The yoke 58 is screwed to a lower portion of the push rod 57. A rear end portion of the brake pedal 13 is rotatably connected to the yoke 58 via a connecting pin 59. The push rod 57 is also provided with an adjustment nut portion 60 for rotating the push rod 57 with a tool such as a spanner when adjusting a vertical position of the yoke 58 with respect to the push rod 57. Further, the push rod 57 is provided with a fixing nut 61 for fixing a vertical position of the yoke 58 with respect to the push rod 57.

A rear brake switch 62 is also provided on the upper bracket 66. The rear brake switch 62 is connected via a transmission spring 63 to a connection portion 64 provided on the brake pedal 13. When the brake pedal 13 is depressed and the front portion of the brake pedal 13 is displaced downward, the displacement is transmitted to the rear brake switch 62 via the transmission spring 63, and the rear brake switch 62 is turned on, for example. For example, when the rear brake switch 62 is turned on, a brake lamp provided at the rear of the straddle-type vehicle 81 lights up. Also, the upper bracket 66 is provided with a cover 67 that covers the rear brake master cylinder 55, the rear brake switch 62, and the like. In FIG. 2A, only the outer shape and hole of the cover 67 are indicated by dashed lines, and the illustration of the cover 67 is omitted in FIG. 3A.

The driver footrest 86 on the right side is attached to the lower bracket 65 in a vicinity of a portion where the pedal shaft 52 is arranged, as illustrated in FIG. 2A. The driver footrest 86 on the right side extends rightward from the lower bracket 65 as illustrated in FIG. 3A.

(Pillion Footrest Unit)

Figure 4A:
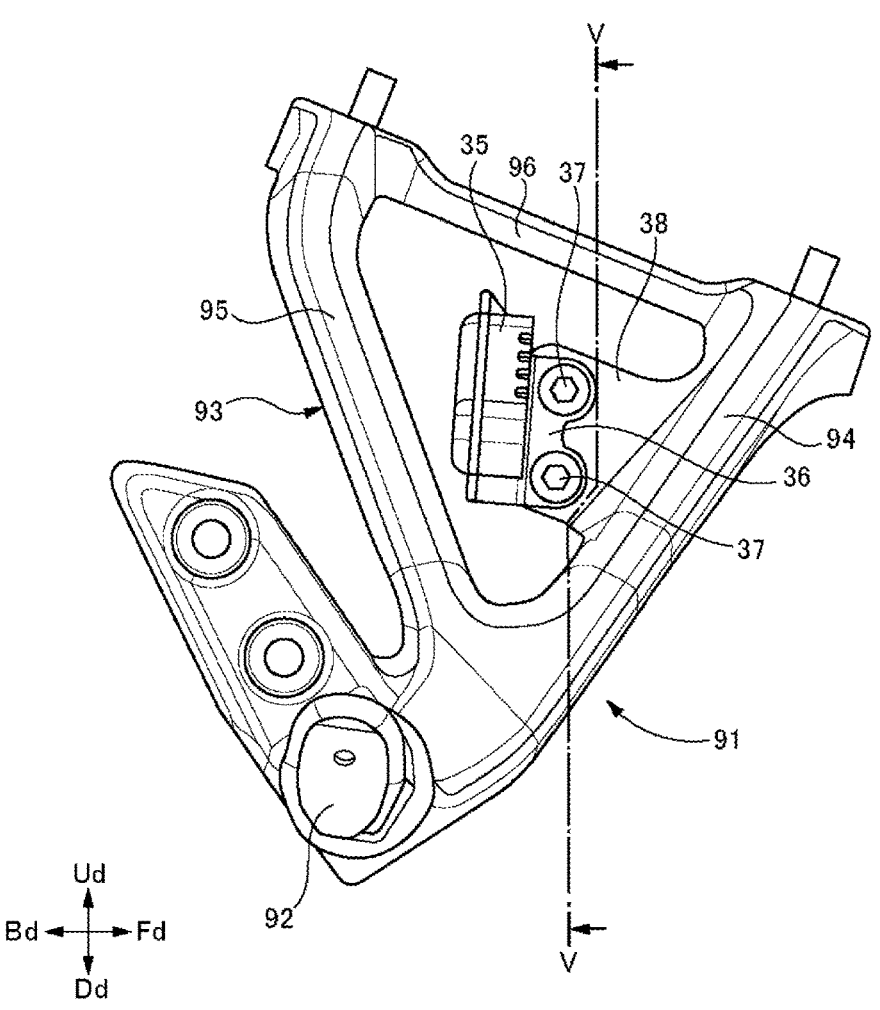
FIGS. 4A and 4B are explanatory views illustrating a pillion footrest unit in the example of the present embodiment viewed from right, where
Figure 5A:
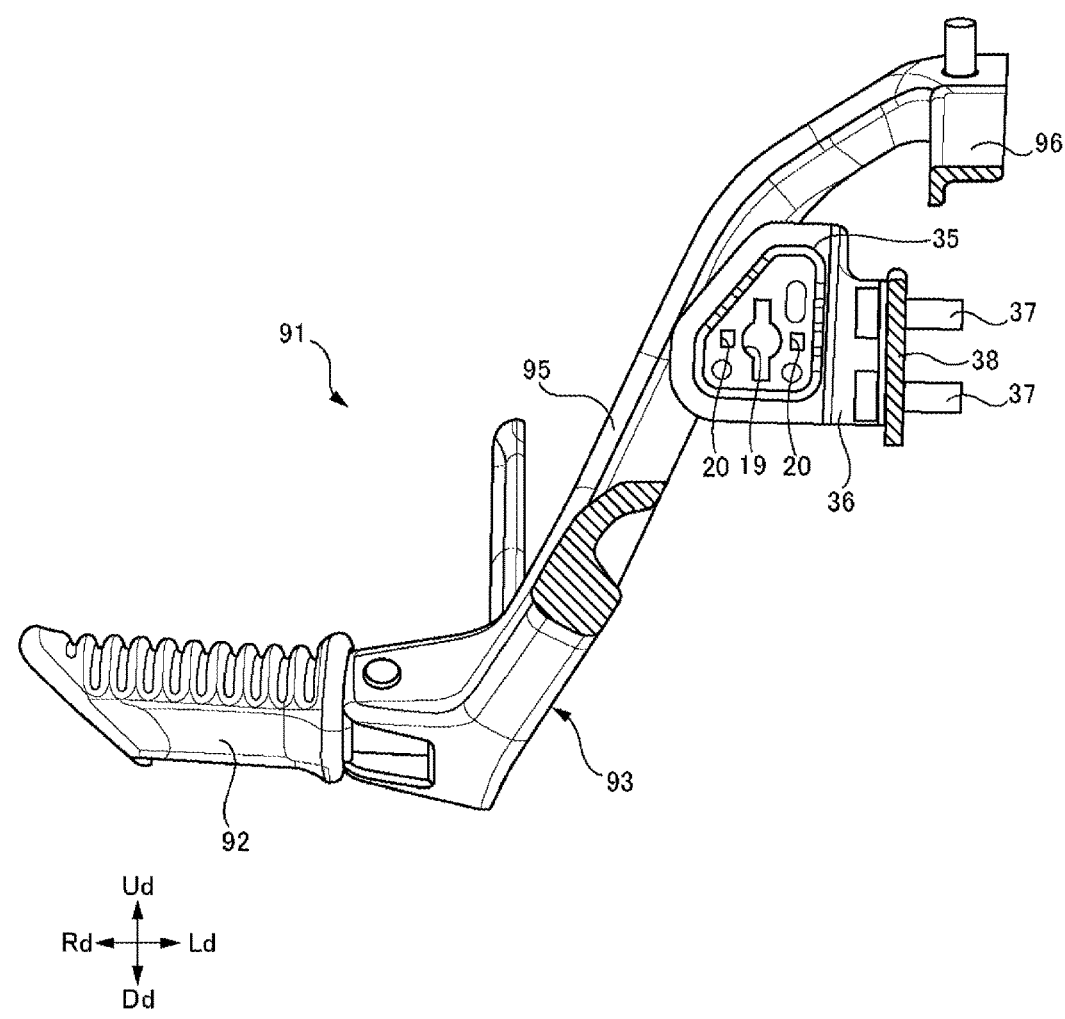
FIGS. 5A and 5B are explanatory views illustrating cross sections of the pillion footrest unit cut along the cutting line V-V in FIG. 4A viewed from front, where
Figure 6A:
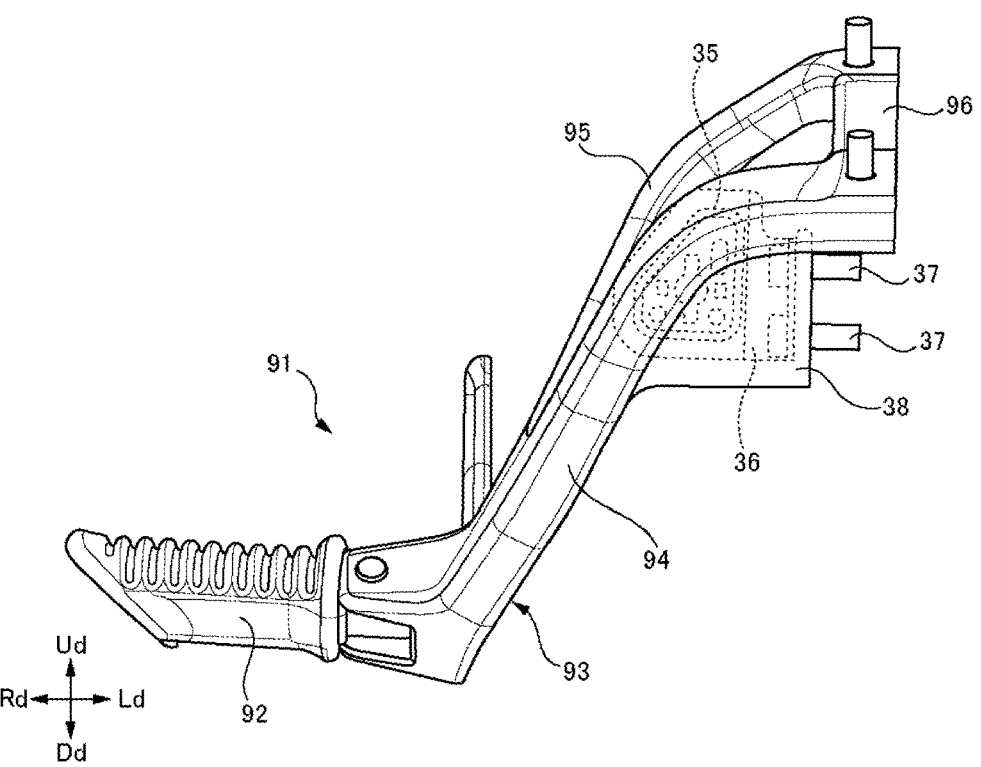
FIGS. 6A and 6B are explanatory views illustrating the pillion footrest unit in the example of the present embodiment viewed from front, where

FIG. 4A illustrates the pillion footrest unit 91 on the right side viewed from the right. FIG. 5A illustrates the pillion footrest unit 91 cut along the cutting line V-V in FIG. 4A as seen from the front (right in FIG. 4A). FIG. 6A illustrates the pillion footrest unit 91 on the right side viewed from the front.

As illustrated in FIGS. 4A, 5A, and 6A, the pillion footrest unit 91 on the right side has the pillion footrest 92 and a pillion footrest bracket 93 that supports the pillion footrest 92 to a seat rail 83 (see FIG. 1) on the right side of the straddle-type vehicle 81. The pillion footrest bracket 93 has two pillar portions 94 and 95 that extend rightward (laterally outward) while being inclined downward from the seat rail 83 on the right side. In addition, base-end-side portions of the two pillar portions 94 and 95 are separated from each other in a front-back direction. Also, base end portions of the two pillar portions 94 and 95 are connected by a beam portion 96. Tip portions of the two pillar portions 94 and 95 are joined together. The pillion footrest 92 is attached to the tip portions of the two pillar portions 94 and 95 that are joined to each other. Although not illustrated, the pillion footrest unit on a left side is formed symmetrically with the pillion footrest unit 91 on the right side. The pillion footrest unit 91 on the right side is provided with a holder 35 for holding the tread surface forming member 21 on the straddle-type vehicle 81 when the tread surface forming member 21 is not in use. The holder 35 will be described below.

(Brake Pedal System)

The straddle-type vehicle 81 is provided with the brake pedal system 1. As illustrated in FIG. 1, the brake pedal system 1 is composed of at least the brake pedal 13 and the tread surface forming member 21 in the rear brake system 51, and the holder 35 provided in the pillion footrest unit 91 on the right side. The brake pedal 3 is a specific example of an "operation pedal".

Figure 2B:
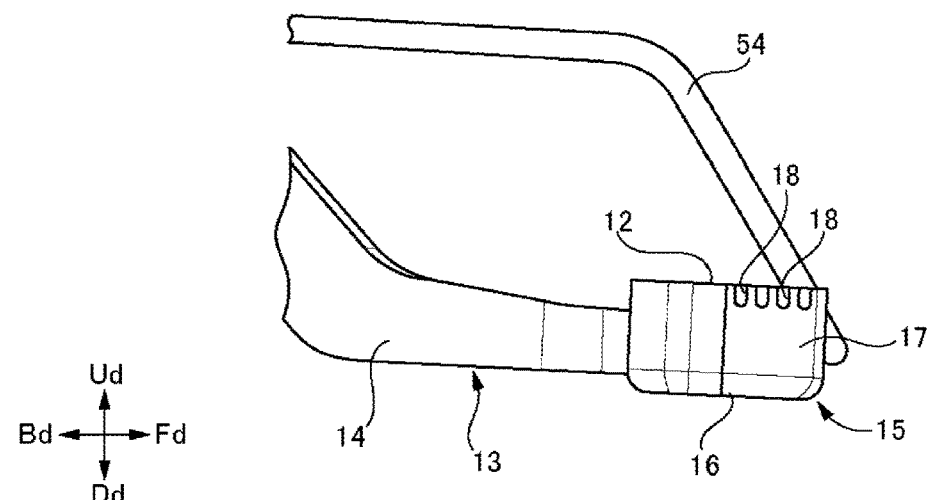
Figure 3B:
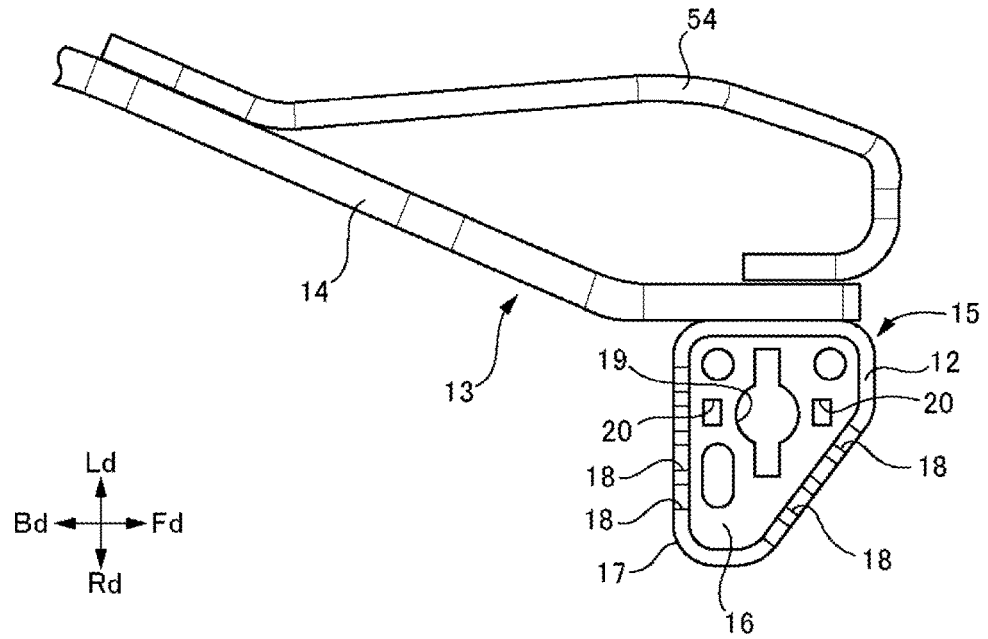

The brake pedal system 1 has a function of adjusting a height position of a tread surface of the brake pedal 13 in two steps by attaching or detaching the tread surface forming member 21 to or from a pedal portion 15 of the brake pedal 13. FIGS. 2A and 3A illustrate a state where the tread surface forming member 21 is attached to the pedal portion 15 of the brake pedal 13, and FIGS. 2B and 3B illustrate a state where the tread surface forming member 21 is not attached to the pedal portion 15 of the brake pedal 13. As illustrated in FIGS. 2A and 3A, by attaching the tread surface forming member 21 to the pedal portion 15 of the brake pedal 13, a first tread surface 11 that receives a stepping force when the driver steps on the brake pedal 13 is formed above the pedal portion 15 of the brake pedal 13. That is, when the tread surface forming member 21 is attached to the pedal portion 15 of the brake pedal 13, the tread surface of the brake pedal 13 is the first tread surface 11. Also, as illustrated in FIGS. 2B and 3B, a second tread surface 12 is formed on the upper surface of the pedal portion 15 of the brake pedal 13 to receive a stepping force when the driver steps on the brake pedal 13. When the tread surface forming member 21 is not attached to the pedal portion 15 of the brake pedal 13, the tread surface of the brake pedal 13 is the second tread surface 12. As can be seen from FIGS. 2A and 2B, a height position of the first tread surface 11 is higher than a height position of the second tread surface 12. A height difference between the first tread surface 11 and the second tread surface 12 corresponds to a thickness H of a body portion 22 of the tread surface forming member 21. By attaching the tread surface forming member 21 to the pedal portion 15 of the brake pedal 13, the height position of the tread surface of the brake pedal 13 can be raised. On the other hand, by removing the tread surface forming member 21 from the pedal portion 15 of the brake pedal 13, the height position of the tread surface of the brake pedal 13 can be lowered.

Figure 4B:
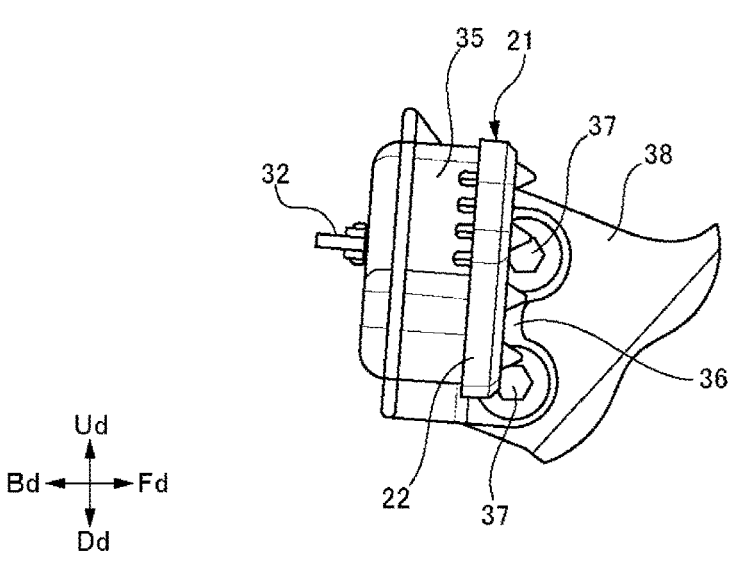
Figure 5B:
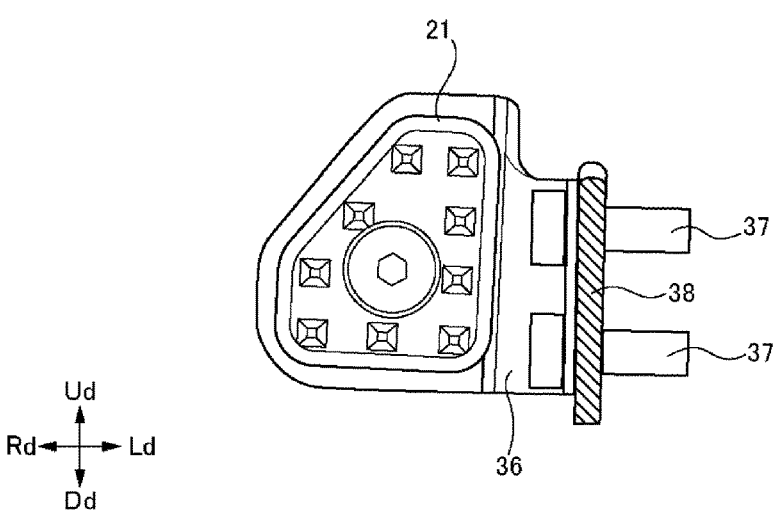

In addition, the brake pedal system 1 has a function of holding the tread surface forming member 21 on the straddle-type vehicle 81 so that when the tread surface forming member 21 is removed from the pedal portion 15 of the brake pedal 13, the tread surface forming member 21 does not interfere with the driver's stepping operation of the brake pedal 13 by attaching the tread surface forming member 21 to the holder 35. FIGS. 4A and 5A illustrate the state where the tread surface forming member 21 is not attached to the holder 35, and FIGS. 4B and 5B illustrate the state where the tread surface forming member 21 is attached to the holder 35. As illustrated in FIGS. 4B and 5B, when the tread surface forming member 21 is removed from the pedal portion 15 of the brake pedal 13, by attaching the tread surface forming member 21 to the holder 35, the tread surface forming member 21 can be held by the straddle-type vehicle 81. Also, the holder 35 is provided in the pillion footrest unit 91, and the pillion footrest unit 91 is arranged at a position far away from the brake pedal 13. Therefore, by attaching the tread surface forming member 21 removed from the pedal portion of the brake pedal 13 to the holder 35, the tread surface forming member 21 removed from the pedal portion 15 of the brake pedal 13 does not interfere with the driver's stepping operation of the brake pedal 13.

(Brake Pedal)

The brake pedal 13 has an arm portion 14 and the pedal portion 15 as illustrated in FIGS. 2A and 3A. The arm portion 14 is made of metal, for example, in a shape of an elongated plate, and extends generally in the front-back direction. Specifically, when the arm portion 14 is viewed from the right, as illustrated in FIG. 2A, a rear end portion and a front end portion of the arm portion 14 extend in the front-back direction. However, in order to avoid interference between the arm portion 14 and the lower bracket 65, or the like, a front-back direction intermediate portion of the arm portion 14 is curved to draw an upwardly convex arc. When the arm portion 14 is viewed from above, as illustrated in FIG. 3A, the rear end portion and the front end portion of the arm portion 14 extend in the front-back direction. However, the front-back direction intermediate portion of the arm portion 14 is inclined such that the front portion thereof is displaced more to the right than the rear portion. As a result, the front end portion of the arm portion 14 is positioned further to the right side than the rear end portion of the arm portion 14. Also, as illustrated in FIG. 2A, the rear end portion of the arm portion 14 is swingably supported by the lower bracket 65 via the pedal shaft 52, and the rear end portion of the arm portion 14 is rotatably connected to the yoke 58 via the connecting pin 59. Further, the connection portion 64 is provided at a substantially front-back direction intermediate portion of the arm portion 14, and a lower end portion of the transmission spring 63 is connected to the connection portion 64.

As illustrated in FIG. 3B, the pedal portion 15 is provided at a front end portion of the arm portion 14 and protrudes rightward (laterally outward) from the front end portion of the arm portion 14. The pedal portion 15 is located generally forward of the driver footrest 86 on the right side. The pedal portion 15 is made of metal, for example, and is formed into a bottomed cylindrical shape with an open top. The pedal portion 15 has a bottom portion 16 with a plate shape that extends generally in the front-back direction and the left-right direction, and a peripheral wall portion 17 that extends upward from a peripheral edge of the bottom portion 16. When the pedal portion 15 is viewed from above, the pedal portion 15 has a substantially trapezoidal shape obtained by truncating a front right corner of a rectangle having long sides extending in the left-right direction and short sides extending in the front-back direction. Also, when the pedal portion 15 is viewed from the right, as illustrated in FIG. 2B, a lowermost surface of the pedal portion 15 is located below a lower surface of the front end of the arm portion 14, and an uppermost surface of the pedal portion 15 is located above an upper surface of the front end of the arm portion 14. Further, as illustrated in FIG. 3B, a left outer surface of the peripheral wall portion 17 is joined to a right surface of the front end portion of the arm portion 14 by, for example, welding, whereby the pedal portion 15 is fixed to the arm portion 14.

The second tread surface 12 is formed on the upper surface of the pedal portion 15, specifically, an upper end surface of the peripheral wall portion 17. In addition, as illustrated in FIG. 3B, non-slip grooves 18 are formed in a plurality of portions of the upper end surface of the peripheral wall portion 17. As a result, the upper end surface of the peripheral wall portion 17, that is, the second tread surface 12, is formed with unevenness that functions as an anti-slip.

Further, the bottom portion 16 of the pedal portion 15 is formed with a first latch hole 19 and two second latch holes 20. The arrangement and shape of the first latch hole 19 and each second latch hole 20 are set to correspond to the shape of a lower part of a cylindrical member 29 and a hook 32 of the tread surface forming member 21. The first latch hole 19 is arranged substantially in a center of the bottom portion 16 and two second latch holes 20 are respectively arranged in front and back of the first latch hole 19. When the bottom portion 16 is viewed from above, the first latch hole 19 has a shape in which a hole elongated in the left-right direction and a circular hole with a diameter shorter than the long side and longer than the short side of the long hole are superimposed so that centers of both holes are aligned. In the first latch hole 19, the elongated hole is a hole through which the hook 32 of the tread surface forming member 21 is entirely passed, and the circular hole is a hole through which a lower part of the cylindrical member 29 of the tread surface forming member 21 is inserted. Also, the shape of each second latch hole 20 is, for example, a square. Each second hooking hole 20 is a hole into which a latching protrusion 32A of the hook 32 of the tread surface forming member 21 is inserted.

(Tread Surface Forming Member)

The tread surface forming member 21 is a member that forms the first tread surface 11 above the pedal portion 15 by being attached to the pedal portion 15 of the brake pedal 13. The tread surface forming member 21 is separate from the brake pedal 13. That is, the tread surface forming member 21 is separated from the brake pedal 13 by removing the tread surface forming member 21 from the pedal portion 15 of the brake pedal 13.

Figure 7A:
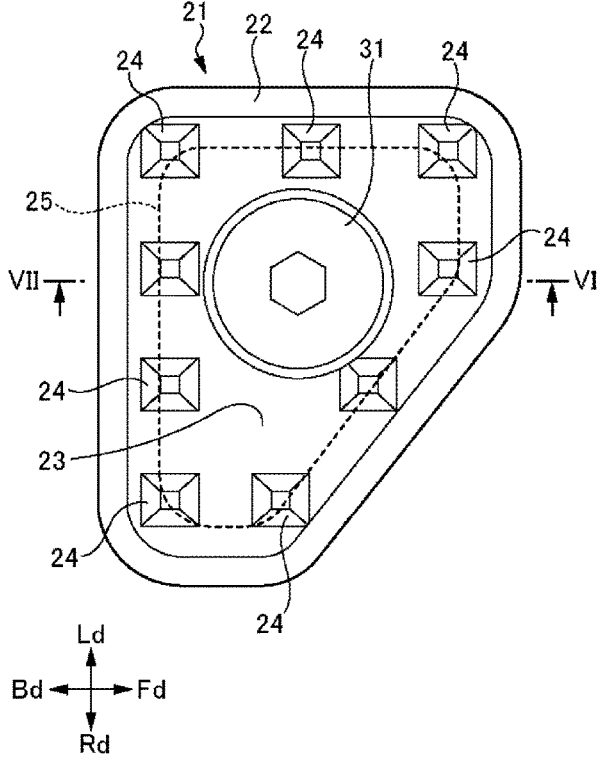
FIGS. 7A to 7D are explanatory views illustrating the tread surface forming member in the example of the present embodiment, where
Figure 7B:
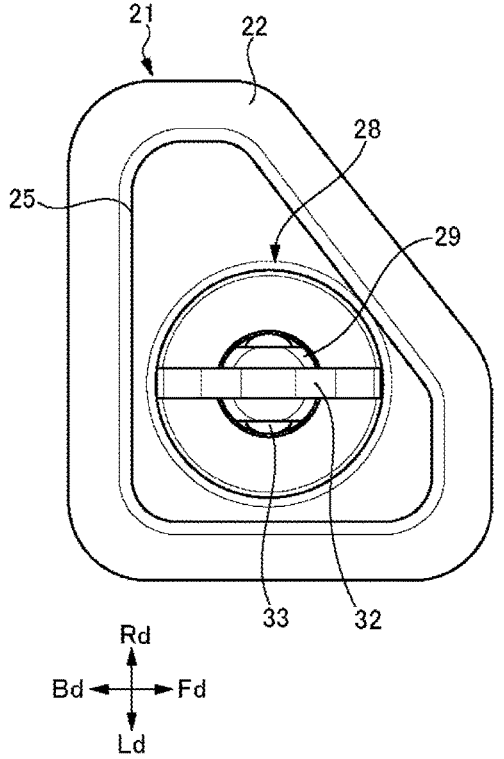
Figure 7C:
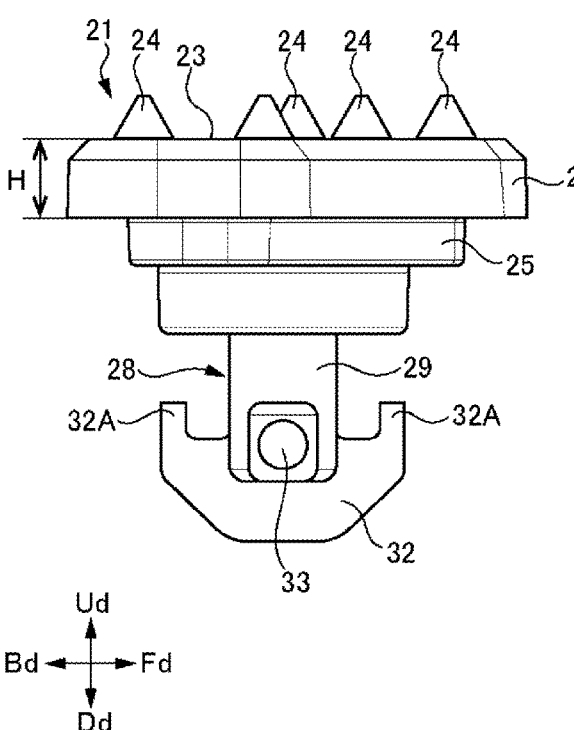
Figure 7D:
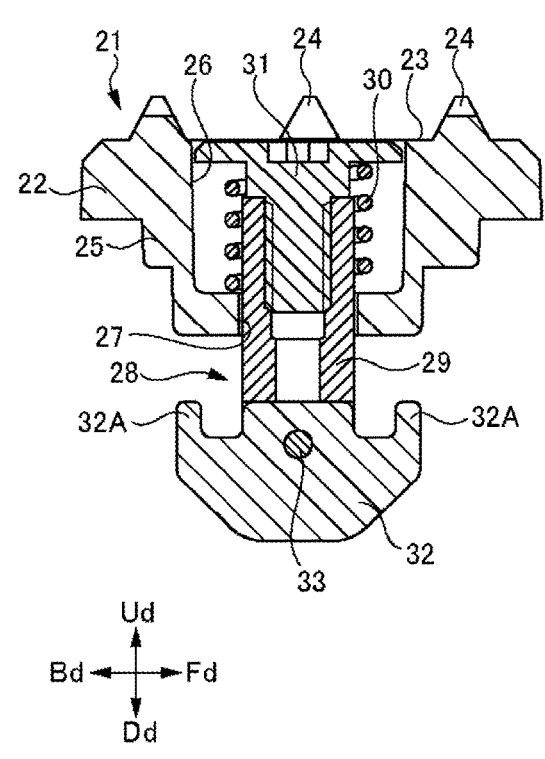

FIGS. 7A to 7D illustrate details of the configuration of the tread surface forming member 21. FIG. 7A illustrates the tread surface forming member 21 viewed from above, FIG. 7B illustrates the tread surface forming member 21 viewed from below, and FIG. 7C illustrates the tread surface forming member 21 viewed from the right. FIG. 7D illustrates a cross section of the tread surface forming member 21 cut along the cutting line VII-VII in FIG. 7A as seen from the right (bottom in FIG. 7A).

The tread surface forming member 21 has the body portion 22 and an attachment mechanism 28, as illustrated in FIG. 7D. The body portion 22 is made of metal, for example, and has a plate shape. When the body portion 22 is viewed from above, as illustrated in FIG. 7A, the body portion 22 has a substantially trapezoidal shape obtained by truncating a right front corner of a rectangle having long sides extending in the left-right direction and short sides extending in the front-back direction. The shape of the body portion 22 when viewed from above is similar to the shape of the pedal portion 15 when viewed from above, and the size of the body portion 22 when viewed from above is larger than the size of the pedal portion 15 when viewed from above.

A tread surface forming surface 23 forming the first tread surface 11 is formed on an upper surface of the body portion 22. A plurality of anti-slip protrusions 24 protruding upward are formed on the tread surface forming surface 23. As a result, the tread surface forming surface 23 is formed with unevenness that functions as an anti-slip.

Also, in FIG. 7C, the thickness H of the body portion 22 in an up-down direction is set to a predetermined value. The thickness H determines an amount of change in a height position of the tread surface of the brake pedal 13 when the tread surface forming member 21 is attached to or detached from the pedal portion 15. That is, by attaching the tread surface forming member 21 to the pedal portion 15, the height of the tread surface of the brake pedal 13 is increased by the thickness H of the body portion 22 compared to before the tread surface forming member 21 is attached to the pedal portion 15.

A fitting portion 25 protruding downward is formed on a lower surface of the body portion 22. As indicated by the dashed line in FIG. 7A, the shape of the fitting portion 25 when viewed from above is substantially similar to the shape of the pedal portion 15 when viewed from above. Further, the size of the fitting portion 25 when viewed from above is slightly smaller than the size of the pedal portion 15 when viewed from above. When the tread surface forming member 21 is attached to the pedal portion 15, the fitting portion 25 is fitted inside the upper portion of the peripheral wall portion 17 of the pedal portion 15 with some play.

Further, inside the body portion 22, as illustrated in FIG. 7D, a spring accommodation portion 26 for accommodating a latching spring 30 and the like is formed. The spring accommodation portion 26 is open upward. In addition, in the body portion 22, an insertion hole 27 is formed in a center of a bottom wall portion of the spring accommodation portion 26 so as to penetrate the bottom wall portion in the up-down direction.

The attachment mechanism 28 is provided on the body portion 22 and is a mechanism for detachably attaching the tread surface forming member 21 to the pedal portion 15. In this example, the attachment mechanism 28 attaches the tread surface forming member 21 to the pedal portion 15 by latching the tread surface forming member 21 onto the pedal portion 15. The attachment mechanism 28 has the cylindrical member 29, the latching spring 30, a spring support bolt 31, and the hook 32. The cylindrical member 29 is a specific example of a "protruding portion", and the hook 32 is a specific example of a "latching portion".

The cylindrical member 29 is formed of metal, for example, in a cylindrical shape and extends in the up-down direction. An upper portion of the cylindrical member 29 is disposed within the spring accommodation portion 26 and a lower portion of the cylindrical member 29 protrudes downward from the body portion 22 through the insertion hole 27. A diameter of the insertion hole 27 is slightly larger than an outer diameter of the cylindrical member 29 so that the cylindrical member 29 can move in the up-down direction along its own axis relative to the body portion 22. Also, the cylindrical member 29 can rotate about its own axis with respect to the body portion 22.

The latching spring 30 is a coil spring and is arranged in the spring accommodation portion 26 on an outer peripheral side of the upper portion of the cylindrical member 29. The spring support bolt 31 is fixed to the upper portion of the cylindrical member 29 by fastening a screw of the spring support bolt 31 to a screw formed on an inner peripheral side of the upper portion of the cylindrical member 29. The spring support bolt 31 can fit entirely within the spring accommodation portion 26. The latching spring 30 is interposed between a head portion of the spring support bolt 31 and a bottom wall portion of the spring accommodation portion 26.

The hook 32 is provided at a lower end portion of the cylindrical member 29. The hook 32 is made of metal, for example. The hook is a plate having an anchor-like outer shape, and the latching protrusions 32A protruding upward are respectively formed at both ends of the hook 32. Also, the hook has a shape and size like a knob and can be held with fingers. Also, a central portion of an upper portion of the hook 32 is joined to a lower end portion of the cylindrical member 29 by a joint pin 33.

The cylindrical member 29, the spring support bolt 31, and the hook 32 can integrally move in the up-down direction with respect to the body portion 22. When the cylindrical member 29, the spring support bolt 31, and the hook 32 move downwards relative to the body portion 22, latching spring 30 contracts. When the latching spring 30 is contracted, the spring force of the latching spring 30 is applied to the head portion of the spring support bolt 31 to push the cylindrical member 29, the spring support bolt 31, and the hook 32 upward against the body portion 22. In addition, the cylindrical member 29, the spring support bolt 31, and the hook 32 can be integrally rotated with respect to the body portion 22 around the axis of the cylindrical member 29.

(Method for Attaching or Detaching Tread Surface Forming Member to or from Pedal Portion)

FIGS. 8A and 8B and FIGS. 9A to 9F illustrate a method of attaching the tread surface forming member 21 to the pedal portion 15. When attaching the tread surface forming member 21 to the pedal portion 15, a user of the straddle-type vehicle 81 first matches an orientation of the tread surface forming member 21 with an orientation of the pedal portion so that, as illustrated in FIG. 8A, the orientation of the substantially trapezoidal shape when the tread surface forming member 21 is viewed from above matches the orientation of the substantially trapezoidal shape when the pedal portion 15 is viewed from above. Next, the user rotates the cylindrical member 29, the spring support bolt 31, and the hook 32 with respect to the body portion 22 by holding the hook 32 with the finger, whereby matching an orientation of the hook 32 with an orientation the elongated hole in the first latch hole 19 of the pedal portion 15, as illustrated in FIGS. 8A and 8B.

Next, the user inserts the attachment mechanism 28 of the body portion 22 into the peripheral wall portion 17 of the pedal portion 15 from above, and then the user inserts the hook 32 and the lower part of the cylindrical member 29 into the first latch hole 19 of the pedal portion 15 and places the body portion 22 on the upper end surface of the peripheral wall portion 17 of the pedal portion 15.

Figure 9A:
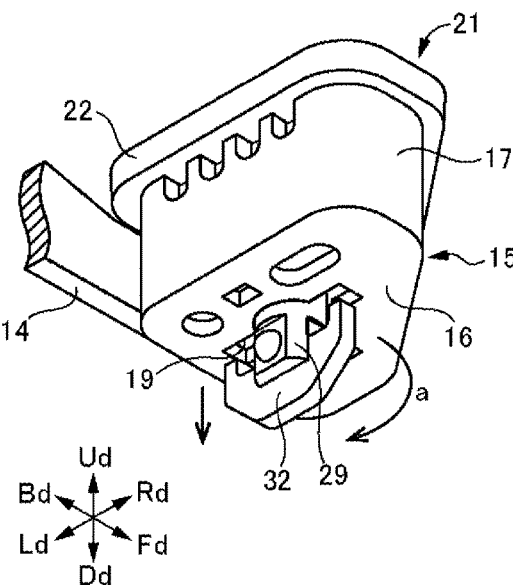
FIGS. 9A to 9F are explanatory views following FIGS. 8A and 8B illustrating a method of attaching the tread surface forming member to the pedal portion.
Figure 9B:
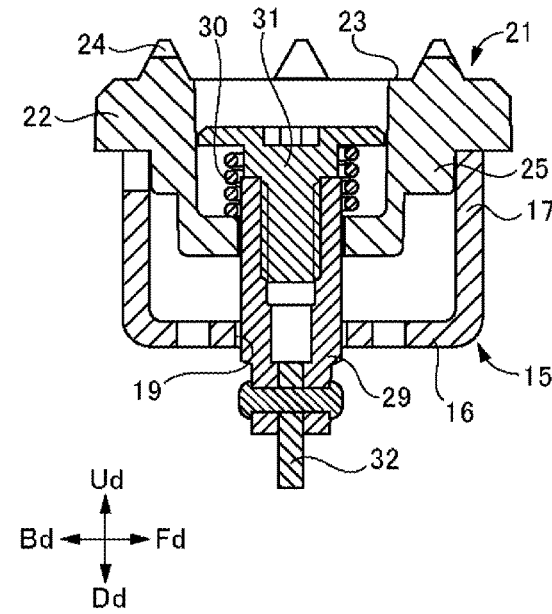

Next, the user holds the hook 32 inserted into the first latch hole 19 from below with a finger and pulls the hook 32 downward with a force exceeding the spring force of the latching spring 30. Then, the user pulls the hook 32 downward until the hook 32 passes through the first latch hole 19 of the pedal portion 15 and moves below the bottom portion 16, as illustrated in FIGS. 9A and 9B. This causes the cylindrical member 29 and the spring support bolt 31 together with the hook 32 to move downward relative to the body portion 22 and the pedal portion 15, causing the latching spring 30 to contract.

Figure 9C:
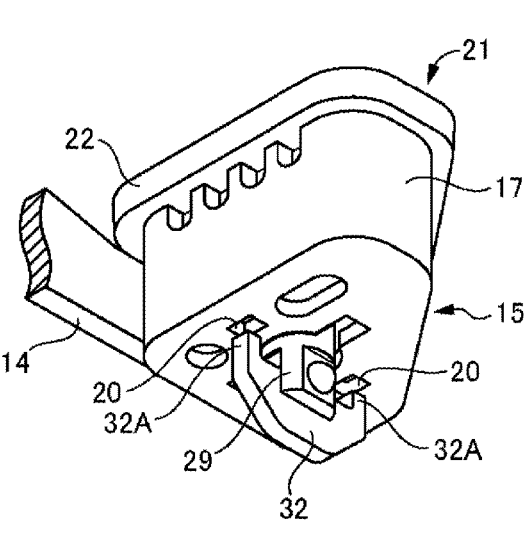
Figure 9D:
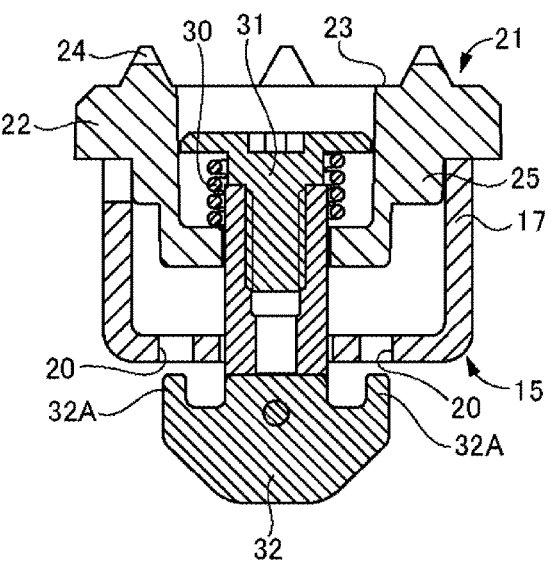

Subsequently, the user rotates the hook 32 by 90 degrees, for example, in a direction of the arrow a in FIG. 9A while keeping the hook 32 pulled down. This causes the cylindrical member 29 and the spring support bolt 31 together with the hook 32 to rotate 90 degrees with respect to the body portion 22 and the pedal portion 15. When the hook, the cylindrical member 29, and the spring support bolt 31 rotate 90 degrees, as illustrated in FIGS. 9C and 9D, the two latching protrusions 32A formed on the hook 32 are respectively positioned just below the two second latch holes 20 formed on the bottom portion 16 of the pedal portion 15.

Figure 9E:
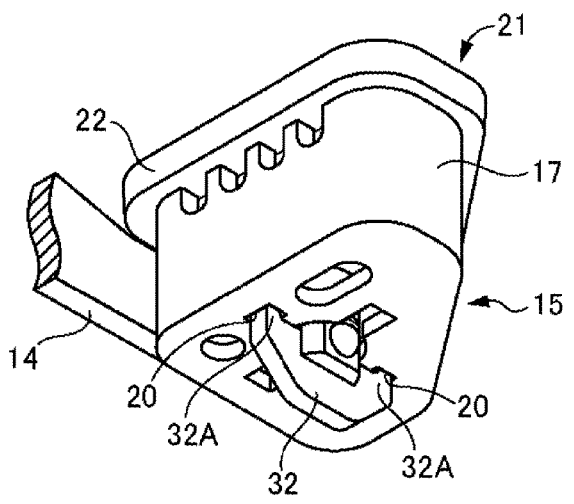
Figure 9F:
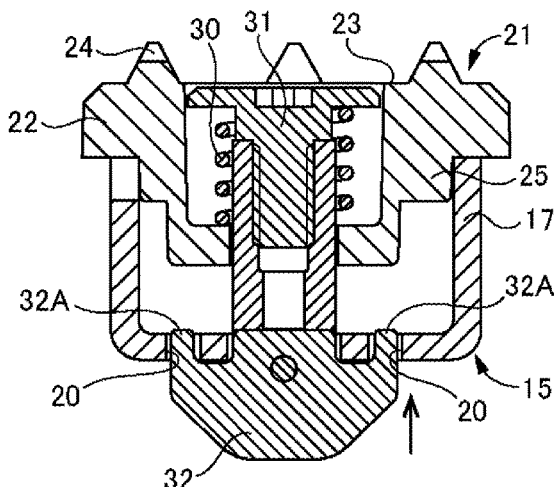

Next, the user releases his or her finger from the hook 32. When the finger is released from the hook 32, the spring force of the latching spring 30 causes the hook 32, the cylindrical member 29, and the spring support bolt 31 to move upward with respect to the body portion 22 and the pedal portion 15, and the two latching protrusions 32A of the hook 32 are respectively inserted into the two second latch holes 20 of the pedal portion 15, as illustrated in FIGS. 9E and 9F. The tread surface forming member 21 is thereby latched to the pedal portion 15.

In addition, when removing the tread surface forming member 21 from the pedal portion 15, the user first pulls the hook 32 downward until the two latching protrusions 32A of the hook 32 come out from the two second latch holes 20 of the pedal portion 15, and then in this state, the hook 32 is rotated 90 degrees to match the orientation of the hook 32 with the orientation of the elongated hole in the first latch hole 19 of the pedal portion 15. Then, the user lifts the tread surface forming member 21 to separate the tread surface forming member 21 from the pedal portion 15.

(Holder)

The holder 35 is a member for holding the tread surface forming member 21 removed from the pedal portion 15 of the brake pedal 13 on the straddle-type vehicle 81. The holder 35 is provided in a portion of the straddle-type vehicle 81 other than the brake pedal 13 and exposed to the outside. In this example, the holder 35 is provided on the pillion footrest unit 91 on the right side as illustrated in FIGS. 4A and 5A. Specifically, the holder 35 is provided between the two pillar portions 94 and 95 of the pillion footrest bracket 93. A portion between the two pillar portions 94 and 95 of the pillion footrest bracket 93 is a portion of the straddle-type vehicle 81 exposed to the outside and a portion other than the brake pedal 13. Also, as illustrated in FIGS. 4B and 5B, the tread surface forming member 21 removed from the pedal portion 15 is attached to the holder 35 while being exposed to the outside.

The holder 35 is made of metal, resin, or the like, for example. The holder 35 has a structure that allows the tread surface forming member 21 to be detachably attached thereto using the attachment mechanism 28 of the tread surface forming member 21. Specifically, the holder 35 has a structure that allows the tread surface forming member 21 to be attached thereto by latching the hook 32 of the tread surface forming member 21 onto itself. The Holder 35 may have the same structure, shape, and size as the pedal portion 15. In this example, the same part as the pedal portion 15 is used as the holder 35. The user can attach or detach the tread surface forming member 21 to or from the holder 35 in the same manner as the method of attaching or detaching the tread surface forming member 21 to or from the pedal portion 15. By using the same parts as the pedal portion 15 for the holder 35 as in this example, the parts can be shared and the manufacturing cost can be reduced.

Also, the holder 35 is fixed to one pillar portion of the pillion footrest bracket 93 via a holder bracket 36. For example, the holder bracket 36 is made of metal, and the holder 35 is fixed to the holder bracket 36 by means of welding or the like. Also, the holder bracket 36 is fixed to a bracket fixing portion 38 formed on the pillar portion 94 on the front side of the pillion footrest bracket 93 using a fixing member 37 such as a bolt.

As illustrated in FIG. 6A, the holder 35 is arranged so as not to protrude laterally outward (to the right) from between the two pillar portions 94 and 95 of the pillion footrest bracket 93 when the straddle-type vehicle 81 is viewed from the front. Specifically, when the straddle-type vehicle 81 is viewed from the front, outside outer surfaces of the two pillar portions 94 and 95 of the pillion footrest bracket 93 extend downward and to the right from the seat rail 83. The holder 35 is entirely located inside (lower left side) than the outside outer surfaces of these two pillar portions 94 and 95.

Figure 6B:
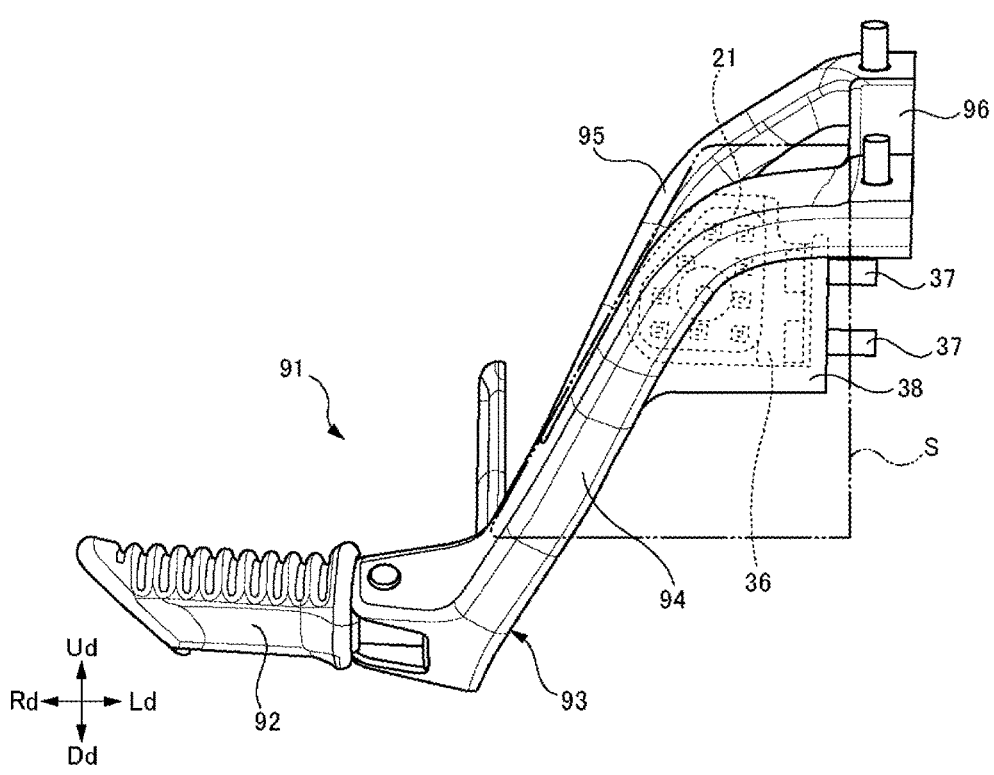

Further, in this example, the shape of the tread surface forming member 21 and the arrangement of the tread surface forming member 21 when the tread surface forming member 21 is attached to the holder 35 are set such that when tread surface forming member 21 is attached to the holder 35, the tread surface forming member 21 attached to the holder 35 is not to protrude laterally outward (to the right) from between the two pillar portions 94 and 95 of the pillion footrest bracket 93 when the straddle-type vehicle 81 is viewed from the front. That is, a space S is formed on the lower left side (inner side in the left-right direction and lower side) of each of the pillar portions 94 and 95 of the pillion footrest bracket 93, as indicated by the two-dot chain line in FIG. 6B. When the straddle-type vehicle 81 is viewed from the front, this space S generally has a trapezoidal shape in which an upper base and a lower base extend in the left-right direction, the upper base is shorter than the lower base, a left (inner) leg extends in the up-down direction, and a right (outer) leg is inclined to the right (outer) from top to bottom. Also, as illustrated in FIG. 7A, when the tread surface forming member 21 is viewed from above, the body portion 22 of the tread surface forming member 21 has a substantially trapezoidal shape obtained by truncating a right front corner of a rectangle having long sides extending in the left-right direction and short sides extending in the front-back direction. Thus, the shape of the tread surface forming member 21 when viewed from above is set to be substantially similar to the shape of the space S when the straddle-type vehicle 81 is viewed from the front. Also, when the tread surface forming member 21 is attached to the holder 35, the tread surface forming member 21 is arranged so that the shape of the tread surface forming member 21 when the straddle-type vehicle 81 is viewed from the front has generally a trapezoidal shape with an upper base and a lower base extending in the left-right direction, the upper base being shorter than the lower base, a left leg extending in the up-down direction, and a right leg being inclined to the right from top to bottom. Thus, the arrangement of the tread surface forming member 21 when the tread surface forming member 21 is attached to the holder 35 is set such that an orientation of the trapezoidal shape of the tread surface forming member 21 when the straddle-type vehicle 81 is viewed from the front is aligned with an orientation of the trapezoidal shape of the space S when the straddle-type vehicle 81 is viewed from the front. As a result, the entire tread surface forming member 21 attached to the holder 35 is completely accommodated in the space S formed on the lower left side of each of the pillar portions 94 and 95 of the pillion footrest bracket 93.

As described above, the brake pedal system 1 of the example of the present embodiment includes the tread surface forming member 21 that forms a tread surface above the pedal portion 15 by being attached to the pedal portion 15 of the brake pedal 13. The tread surface forming member 21 has the body portion 22 in which the tread surface forming surface 23 is formed on the upper surface, and the attachment mechanism 28 for detachably attaching the tread surface forming member 21 to the pedal portion 15. With this configuration, according to the brake pedal system 1 of this example, the height position of the tread surface of the brake pedal 13 can be adjusted by attaching or detaching the tread surface forming member 21 to or from the pedal portion 15 of the brake pedal 13.

Also, in the brake pedal system 1 of this example, the tread surface forming surface 23 forming the first tread surface 11 is formed on the upper surface of the tread surface forming member 21, and a second tread surface 12 is formed on the upper surface of the pedal portion 15. In this example, when the tread surface forming member 21 is attached to the pedal portion 15, the tread surface of the brake pedal 13 is the first tread surface 11, whereas when the tread surface forming member 21 is not attached to the pedal portion 15, the tread surface of the brake pedal 13 is the second tread surface 12. With this configuration, by attaching or detaching the single tread surface forming member 21 to or from the pedal portion 15, the height position of the tread surface of the brake pedal 13 can be adjusted in two steps.

Also, in the brake pedal system 1 of this example, the tread surface forming member 21 has the attachment mechanism 28 that attaches the tread surface forming member 21 to the pedal portion 15 by latching the tread surface forming member 21 onto the pedal portion 15. With this configuration, it becomes possible to attach or detach the tread surface forming member 21 to or from the pedal portion 15 without using a tool such as a spanner. Thereby, the user can easily attach or detach the tread surface forming member 21 to or from the pedal portion 15 in a short time. Since no tools are required for attaching or detaching the tread surface forming member 21 to or from the pedal portion 15, the user can easily adjust the height position of the tread surface of the brake pedal 13 while traveling even when the user does not carry a tool. In addition, since the tread surface forming member 21 can be easily attached to or detached from the pedal portion 15 as described above, the user can safely perform adjustment work for the height position of the tread surface of the brake pedal 13 even in a slightly unstable place such as a shoulder of an unpaved forest road while traveling. Thus, according to the brake pedal system 1 of the present example, it is possible to enhance the convenience of adjusting the height position of the tread surface of the brake pedal.

Also, in the brake pedal system 1 of this example, the attachment mechanism 28 of the tread surface forming member 21 has the cylindrical member 29 protruding downward from the body portion 22, and the hook 32 with an anchor shape provided at the lower end portion of the cylindrical member 29. The pedal portion 15 is formed in a bottomed cylindrical shape having the bottom portion 16 and the peripheral wall portion 17, and the first latch hole 19 and the second latch hole 20 are formed in the bottom portion 16. Then, the user places the body portion 22 on the peripheral wall portion 17 while inserting the attachment mechanism 28 into the peripheral wall portion 17, and passes the hook 32 through the first latch hole 19 and inserts the latching protrusion 32A of the hook 32 into the second latch hole 20, whereby the tread surface forming member 21 can be easily attached to the pedal portion 15. In addition, the state in which each latching protrusion 32A of the hook 32 is inserted into the second latch hole 20 is maintained by the spring force of the latching spring 30. Thereby, the state in which the tread surface forming member 21 is attached to the pedal portion 15 can be maintained, and thus it is possible to prevent the tread surface forming member 21 from coming off from the pedal portion 15 due to vibrations or the like when the straddle-type vehicle 81 is traveling.

Further, in the brake pedal system 1 of this example, the tread surface forming member 21 is separate from the brake pedal 13, so that it can be completely separated from the brake pedal 13. Therefore, when the tread surface forming member 21 is removed from the pedal portion 15, that is, when the tread surface forming member 21 is not in use, it is possible to prevent the tread surface forming member 21 from interfering with the stepping operation on the brake pedal 13 by the driver.

Further, the brake pedal system 1 of this example includes the holder 35 for holding the tread surface forming member 21 removed from the pedal portion 15 on the straddle-type vehicle 81, and the holder 35 is provided on the pillion footrest unit 91 on the right side. The pillion footrest unit 91 is a portion of the straddle-type vehicle 81 other than the brake pedal 13 and is a portion far away from the brake pedal 13. By providing the holder 35 in such a portion to hold the tread surface forming member 21, it is possible to prevent the tread surface forming member 21 from interfering with the driver's stepping operation on the brake pedal 13 when not in use. Further, by providing the holder 35 for holding the tread surface forming member 21 when not in use on the straddle-type vehicle 81, the user can easily carry the tread surface forming member 21 when moving by the straddle-type vehicle 81, and can avoid forgetting to carry the tread surface forming member 21. Further, by always carrying the tread surface forming member 21, when the need arises for the user to adjust the height position of the tread surface of the brake pedal 13 while traveling, the user can do so immediately and reliably.

Also, the tread surface forming member 21 removed from the pedal portion 15 is attached to the pillion footrest unit 91 exposed to the outside in the straddle-type vehicle 81 while being exposed to the outside. With this configuration, it is possible to prevent the straddle-type vehicle 81 from being soiled by falling mud attached to the tread surface forming member 21 or the like. That is, while the tread surface forming member 21 is attached to the pedal portion 15 of the brake pedal 13 and the straddle-type vehicle 81 is traveling on an unpaved road or the like, the tread surface forming member 21 may be attached with mud or the like. When the tread surface forming member 21 with mud or the like is accommodated in a room (for example, a space under the seat surrounded by a seat cowl and the seat) inside the straddle-type vehicle 81, it is conceivable that mud or the like attached to the tread surface forming member 21 may fall into the room and contaminate the room. On the other hand, in the brake pedal system 1 of this example, like the pillion footrest unit 91, the straddle-type vehicle 81 is provided with the holder 35 in a portion exposed to the outside, and the tread surface forming member 21 removed from the pedal portion 15 is attached to the holder 35 while being exposed to the outside, so mud or the like attached to the tread surface forming member 21 falls to the ground. Therefore, it is possible to prevent the straddle-type vehicle 81 from being soiled by mud or the like attached to the tread surface forming member 21.

Also, the holder 35 is provided between the two pillar portions 94 and 95 of the pillion footrest bracket 93. As a result, it is possible to prevent the holder 35 and the tread surface forming member 21 attached to the holder 35 from interfering with the fellow passenger while securing the ease of attaching or detaching the tread surface forming member 21 to or from the holder 35.

Also, the holder 35 is arranged so as not to protrude laterally outward from between the two pillar portions 94 and 95 of the pillion footrest bracket 93 when the straddle-type vehicle 81 is viewed from the front. This can enhance the effect of preventing the holder 35 and the tread surface forming member 21 attached to the holder 35 from interfering with the fellow passenger.

Also, the shape of the tread surface forming member 21 when viewed from above is set to be substantially similar to the shape of the space S formed on the inner side in the left-right direction and lower side of the pillar portions 94 and 95 of the pillion footrest bracket 93 when viewed from the front of the straddle-type vehicle 81. Further, the arrangement of the tread surface forming member 21 when the tread surface forming member 21 is attached to the holder 35 is set such that the orientation of the shape of the tread surface forming member 21 when the straddle-type vehicle 81 is viewed from the front is aligned with the orientation of the shape of the space S when the straddle-type vehicle 81 is viewed from the front. Due to this shape and arrangement of the tread surface forming member 21, it is possible to prevent the tread surface forming member 21 attached to the holder 35 from protruding laterally outward from between the two pillar portions 94 and 95 of the pillion footrest bracket 93 when the straddle-type vehicle 81 is viewed from the front. Therefore, it is possible to enhance the effect of preventing the tread surface forming member 21 attached to the holder from interfering with the fellow passenger.

Figure 10A:
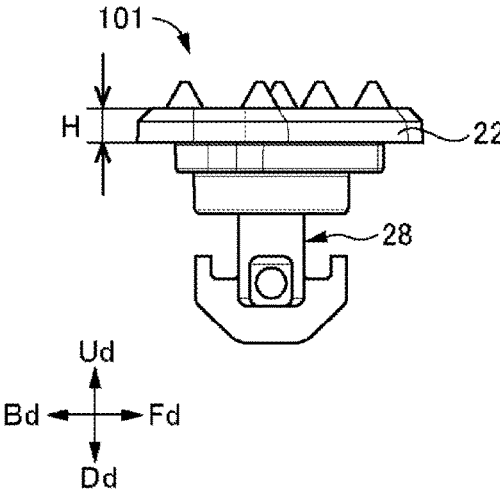
FIGS. 10A to 10F are explanatory views illustrating other examples of the tread surface forming member according to the present embodiment.
Figure 10B:
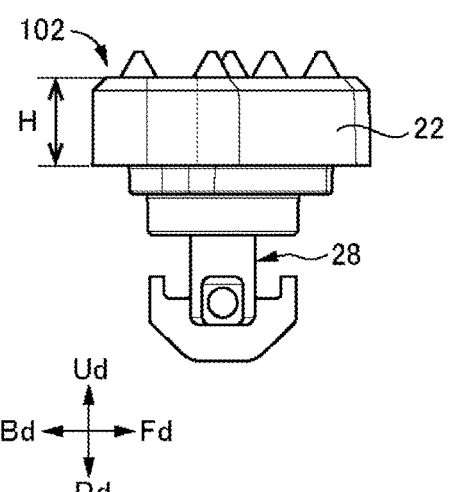

In the above-described example, a configuration in which the height position of the tread surface of the brake pedal 13 is adjusted in two steps by attaching or detaching the single tread surface forming member 21 to or from the pedal portion 15 is taken as an example. However, the present invention is not limited to this. For example, as illustrated in FIGS. 10A and 10B, by providing a plurality of tread surface forming members 101 and 102 having different thicknesses H of respective body portions 22 and switchably attaching the tread surface forming member 101 or 102 to the pedal portion 15, the height position of the tread surface of the brake pedal 13 may be adjusted. For example, the tread surface forming member 101 is attached to the pedal portion 15 when traveling on a paved road, and the tread surface forming member 102 is attached to the pedal portion 15 when traveling on an unpaved road. By providing three or more tread surface forming members each having a different thickness H of a body portion 22, the height position of the tread surface of the brake pedal 13 can be adjusted in multiple steps.

Figure 10C:
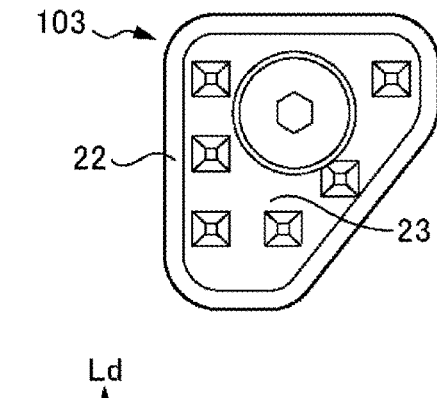
Figure 10D:
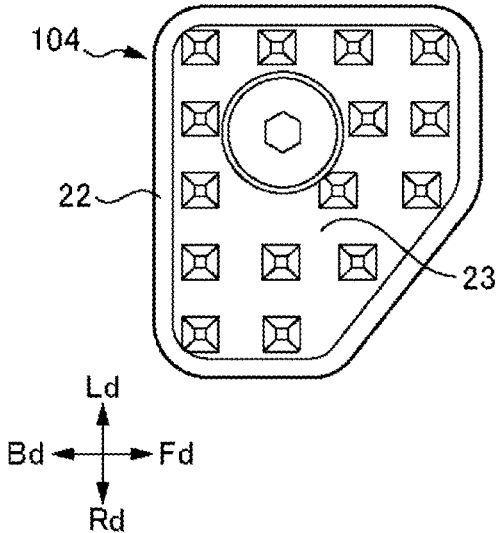
Figure 10E:
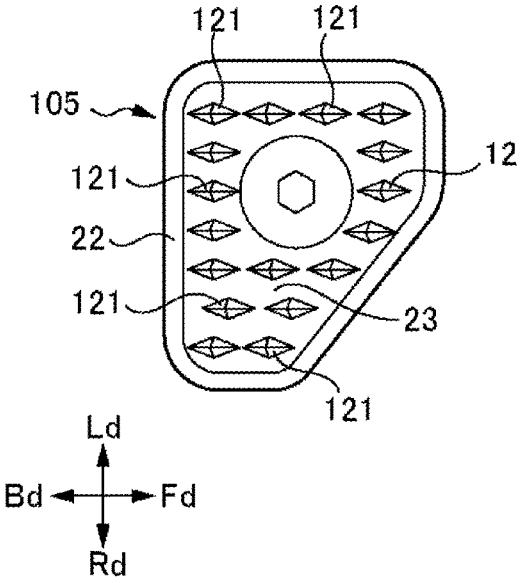
Figure 10F:
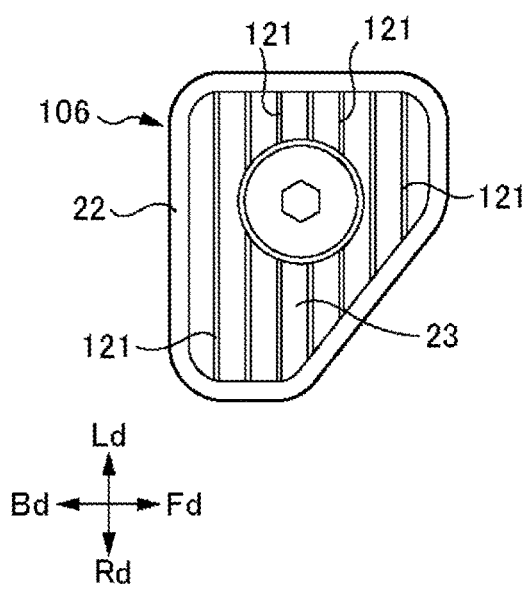

Further, in the above-described example, the case of adjusting the height position of the tread surface of the brake pedal 13 is taken as an example, but the present invention is not limited to this. According to the present embodiment, the shape of the tread surface of the brake pedal 13 may be changed. For example, as illustrated in FIGS. 10C and 10D, by providing a plurality of tread surface forming members 103 and 104 having different areas of tread surface forming surfaces 23 and switchably attaching the tread surface forming member 103 or 104 to the pedal portion 15, the area of the tread surface of the brake pedal 13 may be changed. Also, as illustrated in FIGS. 10E and 10F, by providing a plurality of tread surface forming members 105 and 106 having different shapes of anti-slips 121 formed on respective tread surface forming surfaces 23 and switchably attaching the tread surface forming member 105 or 106 to the pedal portion 15, the shape of the anti-slip on the tread surface of the brake pedal 13 may be changed.

Further, the shape of the hook 32 of the attachment mechanism 28 of the tread surface forming member 21 in the above example is anchor-shaped, but the shape of the hook 32 may be hook-shaped. Also, the method of attaching the tread surface forming member 21 to the pedal portion 15 is not limited to latching, and may be locking or magnetic force. By either method, the tread surface forming member 21 can be attached to or detached from the pedal portion 15 without using a tool.

Also, the portion where the holder 35 is provided in the straddle-type vehicle 81 is not limited to the pillion footrest unit 91 on the right side as long as it is a portion other than the brake pedal and is exposed to the outside. For example, the pillion footrest unit on the left side, or any other part may be exemplified.

Further, the operation pedal system of the present embodiment can be applied not only to the brake pedal but also to other operation pedals (for example, a rotary shift pedal, or the like) provided in a straddle-type vehicle. Also, although FIG. 1 illustrates an off-road type motorcycle, the present embodiment can be applied to various straddle-type vehicles.

In addition, the present invention can be appropriately modified within the scope of the gist or idea of the invention that can be read from the scope of claims and the entire specification, and an operation pedal system with such modifications is also included in the technical idea of the present invention.

What is claimed is:

1. An operation pedal system that is installed in a saddle-ride vehicle, the operation pedal system comprising:

an operation pedal having an arm portion extending generally in a front-back direction of the saddle-ride vehicle, and a pedal portion protruding outward in a left-right direction in the saddle-ride vehicle from a front end portion of the arm portion; and a tread surface forming member that is attached to the pedal portion to form a first tread surface above the pedal portion that receives a stepping force when a stepping operation is performed on the operation pedal, wherein the tread surface forming member is separate from the operation pedal, the tread surface forming member has, a body portion having a tread surface forming surface forming the first tread surface on an upper surface, and an attachment mechanism provided on the body portion for detachably attaching the tread surface forming member to the pedal portion, the attachment mechanism has a protruding portion protruding downward from the body portion and a latching portion with a hook shape or an anchor shape provided at a lower end portion of the protruding portion, the pedal portion is formed in a bottomed cylindrical shape having a bottom portion with a plate shape that extends generally in the front-back direction and the left-right direction, and a peripheral wall portion that extends upward from a periphery of the bottom portion, a latch hole is formed in the bottom portion, and the tread surface forming member is attached to the pedal portion by inserting the attachment mechanism into the peripheral wall portion, placing the body portion on the peripheral wall portion, and latching the latching portion to the latch hole.

2. The operation pedal system according to claim 1, wherein a second tread surface is formed on an upper surface of the pedal portion to receive a stepping force when the stepping operation is performed on the operation pedal in a state where the tread surface forming member is removed from the pedal portion, and a height of the first tread surface formed by attaching the tread surface forming member to the pedal portion is higher than a height of the second tread surface.

3. The operation pedal system according to claim 1, further comprising:

a holder for holding the tread surface forming member removed from the pedal portion on the saddle-ride vehicle, wherein the holder is provided in a portion of the saddle-ride vehicle other than the operation pedal.

4. The operation pedal system according to claim 3, wherein the holder is provided in a portion of the saddle-ride vehicle other than the operation pedal and exposed to outside, and the tread surface forming member removed from the pedal portion is attached to the holder in a state of being exposed to outside.

5. An operation pedal system that is installed in a saddle-ride vehicle, the operation pedal system comprising:

an operation pedal having an arm portion extending generally in a front-back direction of the saddle-ride vehicle, and a pedal portion protruding outward in a left-right direction in the saddle-ride vehicle from a front end portion of the arm portion;

a tread surface forming member that is attached to the pedal portion to form a first tread surface above the pedal portion that receives a stepping force when a stepping operation is performed on the operation pedal; and a holder for holding the tread surface forming member removed from the pedal portion on the saddle-ride vehicle, wherein the tread surface forming member is separate from the operation pedal, the tread surface forming member has, a body portion having a tread surface forming surface forming the first tread surface on an upper surface, and an attachment mechanism provided on the body portion for detachably attaching the tread surface forming member to the pedal portion, the holder is provided in a portion of the saddle-ride vehicle other than the operation pedal and exposed to outside, the tread surface forming member removed from the pedal portion is attached to the holder in a state of being exposed to outside, the saddle-ride vehicle is provided with a pillion footrest unit having a pillion footrest and a pillion footrest bracket for supporting the pillion footrest to the saddle-ride vehicle, and the holder is provided in the pillion footrest unit.

6. The operation pedal system according to claim 5, wherein the pillion footrest bracket extends outward in the left-right direction from the saddle-ride vehicle and has two pillar portions separated from each other, and the holder is provided between the two pillar portions.

7. The operation pedal system according to claim 6, wherein the holder is arranged so as not to protrude outward in the left-right direction from between the two pillar portions when the saddle-ride vehicle is viewed from the front.

* * * * *